US012139417B2

(12) United States Patent
Dubois et al.

(10) Patent No.: US 12,139,417 B2
(45) **Date of Patent: *Nov. 12, 2024**

(54) SELF-DECONTAMINATING ANTIMICROBIAL COMPOSITIONS, ARTICLES, AND STRUCTURES, AND METHODS OF MAKING AND USING THE SAME

(71) Applicant: NANOIONIX, LLC, Farmington, CT (US)

(72) Inventors: Lawrence H. Dubois, Danbury, CT (US); Dana Alexa Totir, Sandy Hook, CT (US)

(73) Assignee: NANOIONIX, LLC, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/165,733

(22) Filed: Feb. 7, 2023

(65) Prior Publication Data

US 2023/0192507 A1 Jun. 22, 2023

Related U.S. Application Data

(63) Continuation of application No. 17/243,364, filed on Apr. 28, 2021, now Pat. No. 11,572,285.
(Continued)

(51) Int. Cl.
*C01G 45/12* (2006.01)
*A01N 59/02* (2006.01)
(Continued)

(52) U.S. Cl.
CPC ......... *C01G 45/1264* (2013.01); *A01N 59/02* (2013.01); *A01N 59/06* (2013.01);
(Continued)

(58) Field of Classification Search
CPC .... C01G 45/1264; A01N 59/02; A01N 59/06; A01N 59/20; C01P 2002/74;
(Continued)

(56) References Cited

U.S. PATENT DOCUMENTS 8,067,403 B2 11/2011 Whiteford et al.
2005/0031519 A1 2/2005 Vaughey et al.
(Continued)

FOREIGN PATENT DOCUMENTS

CN 101133743 A 3/2008
CN 104786587 A 7/2015
(Continued)

OTHER PUBLICATIONS

Kim et al (Year: 2019).*
(Continued)

*Primary Examiner* — Trevor Love
(74) *Attorney, Agent, or Firm* — Steven J. Hultquist; Hultquist, PLLC

(57) ABSTRACT

An antimicrobial material including a substrate and an antimicrobial mixed metal oxide, mixed metal sulfide, or mixed metal oxysulfide in and/or on the substrate is described, as well as antimicrobial coating materials and coatings formed therefrom. The antimicrobial material may be constituted in an antimicrobial surface of a surface-presenting substrate, to combat transmission and spread of microbial disease, e.g., disease mediated by microbial pathogens such as bacteria, viruses, and fungi. Antimicrobial mixed metal oxide, mixed metal sulfide, or mixed metal oxysulfide as described may be contacted with microorganisms to effect inactivation thereof.

29 Claims, 5 Drawing Sheets

Related U.S. Application Data

(60) Provisional application No. 63/062,517, filed on Aug. 7, 2020, provisional application No. 63/016,325, filed on Apr. 28, 2020.

(51) Int. Cl.
*A01N 59/06* (2006.01)
*A01N 59/20* (2006.01)

(52) U.S. Cl.
CPC .......... *A01N 59/20* (2013.01); *C01P 2002/74* (2013.01); *C01P 2004/03* (2013.01); *C01P 2006/90* (2013.01)

(58) Field of Classification Search
CPC ............. C01P 2004/03; C01P 2006/90; C01P 2002/32; C04B 35/62222; C04B 2235/3201; C04B 35/51; C04B 2235/3225; C04B 2235/3232; C04B 2235/3241; C04B 35/016; C04B 35/547
See application file for complete search history.

(56) References Cited

U.S. PATENT DOCUMENTS

| | | | |
|---|---|---|---|
| 2010/0178588 A1 | 7/2010 | White et al. |
| 2017/0000115 A1 | 1/2017 | Nassar et al. |
| 2017/0001151 A1 | 1/2017 | Na et al. |
| 2017/0291170 A1 | 10/2017 | Sambandan et al. |
| 2021/0331937 A1 | 10/2021 | Dubois et al. |

FOREIGN PATENT DOCUMENTS

| | | | |
|---|---|---|---|
| CN | 105731969 A | 7/2016 |
| WO | 2013128191 A1 | 9/2013 |

OTHER PUBLICATIONS

Yasuyuki et al (Year: 2010).*
Abdel-Khalek, E.K., et al., "Synthesis and characterization of SrFeO3-δ nanoparticles as antimicrobial agent", Journal of Sol-Gel Science and Technology, 2020, pp. 27-38, vol. 97.
Abirami, R., et al., "Synthesis and characterization of ZnTiO3 and Ag doped ZnTiO3 perovskite nanoparticles and their enhanced photocatalytic and antibacterial activity", Journal of Solid State Chemistry, 2020, pp. 121-19, vol. 281.
Ahn, Le H.T., et al., "Synthesis of ZnTiO3 and Ag/ZnTiO3 and Their Antibacterial Performances", Materials Transactions, 2018, pp. 1112-1116, vol. 59, No. 7.
Balaji, M., et al., "Structural and antibacterial effect of CaFexMn1-xO3-δ & BaFexMn1-xO3 Perovskite films", International Journal of MediPharm Research, 2017, pp. 178-186, vol. 3, No. 1.
Biswas, S., et al., "Antibiotic loading and release studies of LSMO nanoparticles embedded in an acrylic polymer", Phase Transitions, 2016, pp. 1203-1212, vol. 89, No. 12, Publisher: Taylor & Francis.
Ciotti, M., et al., "COVID-19 Outbreak: An Overview", Chemotherapy, 2019, pp. 215-223, vol. 64, Publisher: Karger.
Cota, J., et al., "Ln complexes as double faced agents: Study of antibacterial and antifungal activity", Coordination Chemistry Reviews, 2019, pp. 49-71, vol. 396.
Dancer, S., "Controlling Hospital-Acquired Infection: Focus on the Role of the Environment and New Technologies for Decontamination", Clinical Microbiology Reviews, Oct. 2014, pp. 665-690, vol. 27, No. 4, Publisher: cmr.asm.org.
De, D., et al., "Antibacterial Effect of Lanthanum Calcium Manganate (La0.67Ca0.33MnO3) Nanoparticles Against Pseudomonas aeruginosa ATCC 27853", Journal of Biomedical Nanotechnology, 2010, DOI: 10.1156/jbn.2010.1113, vol. 6, No. 2.
Edobor-Osoh, A., et al., "Synthesis, Characterization and Magnetic Study of La0.33Ca0.67Mn0.99Fe0.01O3 Functionalised for Antimicrobial Therapy", 3rd International Conference on Science and Sustainable Development, IOP Conf. Series: Journal of Physics, 2019, doi:10.1088/1742-6596/1299/1/012113, vol. 1299, No. 012113, Publisher: Conf. Series, 2019, IOP Publishing.
Ehi-Eromosele, C.O., et al., "The Effect of Silica Coatings on the Structural, Magnetic and Antimicrobial Properties of Silver Doped Manganite Magnetic Nanoparticles for Biomedical Applications", Journal of Bionanoscience, 2017, pp. 1-6, vol. 11.
Huang, J-J, et al., "Characterization of Fe—Cr alloy metallic interconnects coated with LSMO using the aerosol deposition process", Materials Research Bulletin, 2013, pp. 63-68, vol. 51, Publisher: Elsevier.
Jadhav, A.L., et al., "Antibacterial activity of LaNiO3 prepared by sonicated sol-gel method using combination fuel", International Nano Letters, 2020, pp. 23-31, vol. 10.
Jongprateep, O., et al., "Photocatalytic and antimicrobial activities of SrxCa(1-x)TiO3 (x=0, 0.25, 0.5, 0.75 and 1) powders synthesized by solution combustion technique", Journal of Metals, Materials and Minerals, 2019, pp. 42-47, vol. 29, No. 3.
Kampf, Gunter, et al., "Suitability of vaccinia virus and bovine viral diarrhea virus (BVDV) for determining activities of three commonly-used alcohol-based hand rubs against enveloped viruses", BMC Infectious Diseases, 2007, doi: 10.1186/1471-2334-7-5 (1-6), vol. 7, No. 5, Publisher: BioMed Central.
Lu, J., et al., "A preliminary study of the pseudo-capacitance features of the strontium doped lanthanum manganite", RSC Adv., 2015, pp. 5858-5862, vol. 5.
Manjunatha, C.R., et al., "Perovskite lanthanum aluminate nanoparticles applications in antimicrobial activity, adsorptive removal of Direct Blue 53 dye and fluoride", Materials Science & Engineering C, 2019, pp. 674-685, vol. 101.
Mohseni, S., et al., "Evaluation of antibacterial properties of Barium Zirconate Titanate (BZT) nanoparticle", Brazilian Journal of Microbiology, 2014, pp. 1393-1399, vol. 45, No. 4.
Shen, X., et al., "Infrared emissivity of Sr doped lanthanum maganites in coating form", Journal of Alloys and Compounds, 2011, pp. 8116-8119, vol. 509, Publisher: Elsevier.
Singh, C., et al., "A new cost effective potassium based LaFeO3 perovskite for antimicrobial application", International Journal of ChemTech Research, 2019, pp. 87-96, vol. 12, No. 5.
Singh, S., et al., "Doped LaCoO3 perovskite with Fe: A catalyst with potential antibacterial activity", Vacuum, 2017, pp. 468-473, vol. 146.
Tan, S.Z., et al., "Synthesis and antibacterial activity of new layered perovskite compounds, AgxNa2-xLa2Ti3O10", Chinese Chemical Letters, 2007, pp. 85-88, vol. 18.
Tan, S.Z., et al., "Structure and antibacterial activity of new layered perovskite compounds", Trans. Nonferrous Met. Soc. China, 2007, pp. 257-261, vol. 17.
Turky, A.O., et al., "A Robust and Highly Precise Alternative against the Proliferation of Intestinal Carcinoma and Human Hepatocellular Carcinoma Cells Based on Lanthanum Stronium Maganite Nanoparticles", Materials, 2021, https://doi.org/10.3390/ma14174979, vol. 14, No. 4979, Publisher: MDPI.
Weng, D., et al., "Spontaneous and continuous anti-virus disinfection from nonstoichiometric perovskite-type lanthanum manganese oxide", Progress in Natural Science Materials International, 2015, pp. 191-196, vol. 25, Publisher: Elsevier.
Wood, J.P., et al., "Environmental persistence of vaccinia virus on materials", Letters in Applied Microbiology, 2013, pp. 399-404, vol. 57, Publisher: U.S. EPA.
Zhang, L., et al., "Antibacterial activities of mechanochemically synthesized perovskite strontium titanate ferrite metal oxide", Colloids and Surfaces A: Physicochem. Eng. Aspects, 2014, pp. 169-175, vol. 456.
Abe, H., et al., "Dry Coating Technique for Nanosized La0.8Sr0.2MnO3 Powder for SOFC Cathode", ECS Transactions, 2007, pp. 1115-1118, vol. 7, No. 1, Publisher: The Electrochemical Society.
Ehi-Eromosele, C.O., et al., "Magneto-Structural and Antimicrobial Properties of Sodium Doped Lanthanum Manganite Magnetic Nanoparticles for Biomedical Applications: Influence of Silica Coating", Journal of Biomimetics, Biomaterials and Biomedical Engineering, 2018, pp. 117-127, vol. 37, Publisher: Trans Tech Publications.

(56) References Cited

OTHER PUBLICATIONS

Salili, S.M., et al., "Characterization of mechano-thermally synthesized Curie temperature-adjusted La0.8Sr0.2MnO3 (3-aminopropyl) triethoxysilane", Materials Characterization, 2015, pp. 78-85, vol. 106, Publisher: Elsevier.
Uskokovic, V., et al., "Silica-coated lanthanum-strontium manganites for hyperthermia treatments", Materials Letters, 2006, pp. 2620-2622, vol. 60, Publisher: Elsevier.
Wu, L., et al., "Combustion Synthesis of La0.65Sr0.35MnO3 and Its Sensing Properties for NO2", Key Engineering Materials, 2016, pp. 208-211, vol. 680, Publisher: Trans Tech Publications Ltd.
Xu, W., et al., "Polymer-assisted chemical solution synthesis of La0.8Sr0.2MnO3-based perovskite with A-site deficiency and cobalt-doping for bifunctional oxygen catalyst in alkaline media", Electrochimica Acta, 2018, pp. 80-87, vol. 273, Publisher: Elsevier.

* cited by examiner

*BACILLUS ATROPHAEUS*

CARC + 20% VOL CERAMIC / SS DISK

CARC / SS DISK

SELF-DECONTAMINATING ANTIMICROBIAL COMPOSITIONS, ARTICLES, AND STRUCTURES, AND METHODS OF MAKING AND USING THE SAME

CROSS REFERENCE TO RELATED APPLICATIONS

This is a continuation under 35 USC § 120 of U.S. patent application Ser. No. 17/243,364 filed Apr. 28, 2021 in the names of Lawrence H. Dubois and Dana A. Totir for "SELF-DECONTAMINATING ANTIVIRAL COMPOSITIONS AND ARTICLES, AND METHODS OF MAKING AND USING THE SAME", which in turn claims the benefit under 35 USC § 119 of U.S. Provisional Patent Application 63/016,325 filed Apr. 28, 2020 in the names of Lawrence H. Dubois and Dana A. Totir for Self-decontaminating Antiviral Surfaces, and the benefit under 35 USC § 119 of U.S. Provisional Patent Application 63/062,517 filed Aug. 7, 2020 in the names of Lawrence H. Dubois and Dana A. Totir for Robust Self-decontaminating Antimicrobial Coating. The disclosures of all such applications are hereby incorporated herein by reference in their respective entireties, for all purposes.

GOVERNMENT RIGHTS IN THE INVENTION

This invention was made with Government support under Contract W31P4Q-22-C-0004 awarded by the U.S. Defense Advanced Research Projects Agency. The Government has certain rights in the invention.

FIELD

The present disclosure relates to self-decontaminating antimicrobial compositions and articles, and to methods of making and using the same. In various specific aspects, the disclosure relates to self-decontaminating antimicrobial surfaces and coatings, and methods of making and using the same, including methods of combating microbial pathogens, including, for example, enveloped viruses such as poxviruses (e.g., vaccinia) and coronaviruses (e.g., human HCoV-NL63, a surrogate for SARS-CoV-2), bacteria, e.g., *B. atrophaeus, streptococcus, pseudomonas, salmonella, brucella*, and *listeria*, and fungi, e.g., *Candida albicans* or *Aspergillus.*

DESCRIPTION OF THE RELATED ART

Hospital-induced infections, affecting 1 in 25 patients in the United States, are infections that patients get while receiving treatment in all settings of care, including hospitals, surgical centers, ambulatory clinics, and long-term care facilities such as nursing homes and rehabilitation facilities. The most important and frequent mode of transmission is by direct contact with contaminated surfaces such as devices, equipment, medical tools, furniture, rails, door-knobs, etc. Microorganisms (bacteria, viruses, and fungi) are known to survive on 'touch' surfaces for extended periods of time, rendering them sources, or reservoirs, for the spread of pathogens. In the effort to combat such pathogens, sanitizers and disinfectants containing active ingredients such as alcohol, hydrogen peroxide, quaternary ammonium compounds (QACs), and sodium hypochlorite have come into widespread use for removing viral and other pathogenic microbial species from surfaces, but this requires active and ongoing engagement, placing undue burden on persons to continually apply and reapply these formulations, since their effects are short-lived.

It would correspondingly be advantageous to provide antimicrobial self-decontaminating materials that obviate the necessity of application and reapplication of antimicrobial agents to surfaces of objects and structures on or in which microbial pathogens may repose.

Various antibacterial self-decontaminating surface coatings have been developed. For example, titanium dioxide ($TiO_2$)-based surface coatings require ultraviolet light activation by UV lamps or other sources of ultraviolet radiation, and generally are not effective against most viruses. Materials have also been developed incorporating copper and/or silver in metallic, ionic, and nanoparticle forms, which are antibacterial and antifungal in character, but these materials generally have limited antiviral properties. Further, such materials present environmental issues of degradation and leaching, and pose health concerns related to physical irritation and cell toxicity, particularly when metals in such materials are in nanoparticle form.

In the context of the foregoing considerations, the art continues to seek improvements in antimicrobial technologies and approaches for combating pathogenic microbial contamination, including the development of improved antimicrobial compositions, materials, and methods to address increasing concerns of infection and transmission of a vast spectrum of antimicrobial (viral, bacterial and fungal) pathogens.

SUMMARY

The present disclosure relates to antimicrobial materials, coating compositions, coatings formed therefrom, and articles, objects, structures, assemblies, and subassemblies enhanced with antimicrobial character, incorporating a mixed metal oxide, mixed metal sulfide, or mixed metal oxysulfide which has antimicrobial (including antiviral and antifungal) character without the intervention of external sources of energy like electrons, electromagnetic radiation (e.g., UV or visible light), chemical oxidants (e.g. hydrogen peroxide). The mixed metal oxide, sulfide, or oxysulfide can be an antimicrobial perovskite, spinel, crystalline or semi-crystalline ceramic, or other antimicrobial mixed metal oxide, sulfide, or oxysulfide, and methods of making and using the foregoing, as well as methods of inactivating infectious microbial species.

In one aspect, the disclosure relates to an antimicrobial material comprising a substrate, e.g., a fomite substrate, and an antimicrobial mixed metal oxide, mixed metal sulfide, or mixed metal oxysulfide, e.g., an antimicrobial perovskite, spinel, crystalline or semi-crystalline ceramic, or other antimicrobial mixed metal oxide, in and/or on the substrate, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

In another aspect, the disclosure relates to an antimicrobial coating material, comprising a film-forming composition and an antimicrobial mixed metal oxide, mixed metal sulfide, or mixed metal oxysulfide, e.g., an antimicrobial perovskite, spinel, crystalline or semi-crystalline ceramic, or other antimicrobial mixed metal oxide, sulfide, or oxysulfide dispersed therein, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

A further aspect of the disclosure relates to an antimicrobial surface of a surface-presenting substrate, e.g., a fomite substrate, comprising an antimicrobial mixed metal oxide, mixed metal sulfide, or mixed metal oxysulfide, e.g., an antimicrobial perovskite, spinel, crystalline or semi-crystalline ceramic, or other antimicrobial mixed metal oxide, sulfide, or oxysulfide as a component thereof, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

Yet another aspect of the disclosure relates to a method of inactivating a microbial species, comprising contacting the microbial species an antimicrobial mixed metal oxide, mixed metal sulfide, or mixed metal oxysulfide, e.g., an antimicrobial perovskite, spinel, crystalline or semi-crystalline ceramic, or other antimicrobial mixed metal oxide, sulfide, or oxysulfide as a component thereof, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

In various preferred implementations of the foregoing aspects of the disclosure, the antimicrobial mixed metal oxide comprises lanthanum manganese oxide (LMO) that is doped or partially substituted on lanthanum A-sites and/or manganese B-sites with other metal or metals (e.g., alkali metals, alkaline metals, or transition metals).

In other preferred implementations of the foregoing aspects of the disclosure, the antimicrobial mixed metal oxide comprises a doped lanthanum manganese oxide of the formula $La_xM_yMnO_z$ wherein x and y are each independently between 0 and 1, and z is between 2 and 4, with the doped lanthanum manganese oxide being charge balanced, and with the proviso that when y=0, x<0.85.

Other features, aspects, and embodiments of the disclosure will be more fully apparent from the ensuing description and appended claims.

DETAILED DESCRIPTION

Figure 1:
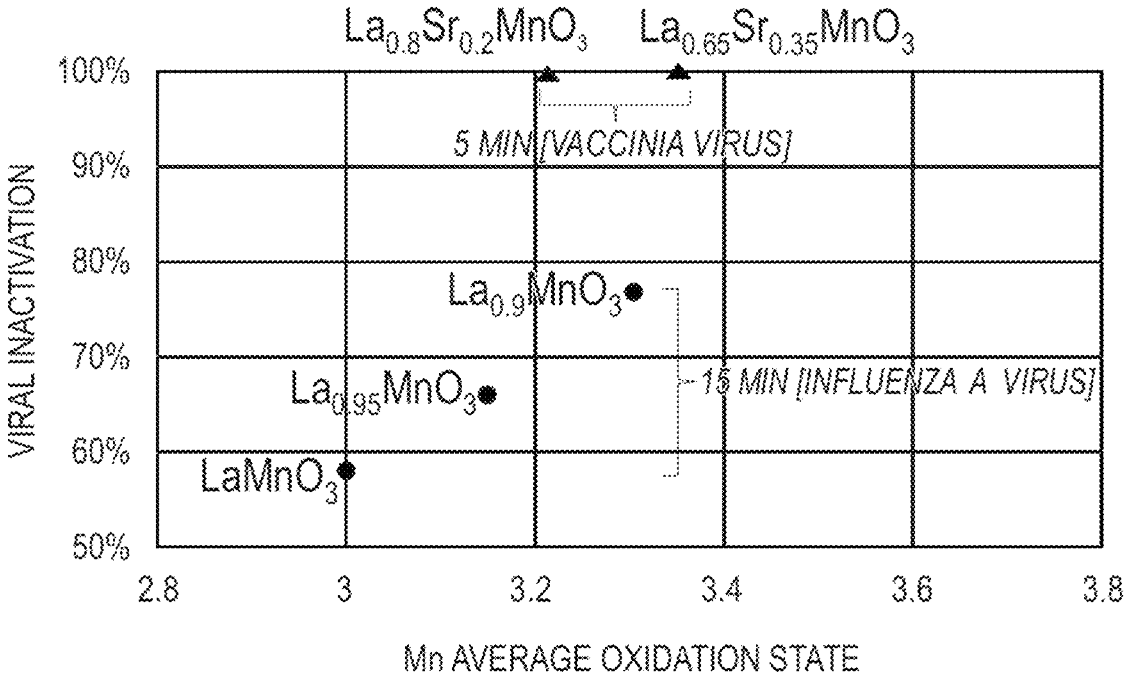
FIG. 1 is a plot of viral inactivation versus average manganese oxidation state for the lanthanum manganese oxide compounds $La_xMnO_3$ wherein x=1, 0.95, and 0.9, described in Weng, et al., "Spontaneous and continuous anti-virus disinfection from nonstoichiometric perovskite-type lanthanum manganese oxide", Progress in Natural Science: Materials International 25 (2015) 191-196, for inactivation of A/PR/8/34H1N1 influenza A virus (PR8), and for representative strontium-substituted lanthanum manganese oxides $La_{0.8}Sr_{0.2}MnO_3$ and $La_{0.65}Sr_{0.35}MnO_3$ of the present disclosure.

As used herein, the following terms have the following meanings:

- the singular forms "a", "and", and "the" include plural referents unless the context clearly dictates otherwise;
- "alkali metal" means lithium (Li), sodium (Na), potassium (K), rubidium (Rb), cesium (Cs), and francium (Fr);
- "alkaline earth metal" means beryllium (Be), magnesium (Mg), calcium (Ca), strontium (Sr), barium (Ba), and radium (Ra);
- "antimicrobial" means having a cidal, inactivating, or reproductively disabling effect on a microorganism, wherein the term "microorganism" refers to at least one microbial species in the classes of bacteria, archaea, protozoa, algae, fungi, viruses and helminths, and "antiviral" means having a cidal, inactivating, or reproductively disabling effect on a virus;
- "contacting" and "contacted" in reference to the antimicrobial agents of the disclosure (antimicrobial mixed metal oxide, mixed metal sulfide, or antimicrobial mixed metal oxysulfide) means that the antimicrobial agent is presented to the microorganism in direct physical contact or in sufficient physical proximity to the microorganism to effect antimicrobial action against such microorganism;

"fomite substrate" means an inanimate material, object, structure, or assembly that when contaminated with or exposed to infectious agents can transfer disease to a new host, excluding materials, objects, structures, and assemblies with which perovskites are associated for carrying out photovoltaic, optoelectronic, superconducting, electrochemical sensing, surface acoustic wave generation, signal processing, electrochromic, switching, image storage, filtering, photochromic, dye decomposition, and fuel cell processes;

"lanthanide elements" shall mean lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu);

"mixed metal oxide" means an oxide containing at least two metal cations, which exhibits antimicrobial (including antiviral) character in the absence of applied energy or chemical oxidants;

"mixed metal sulfide" means a sulfide containing at least two metal cations, which exhibits antimicrobial (including antiviral) character in the absence of applied energy or chemical oxidants;

"mixed metal oxysulfide" means an oxysulfide containing at least two metal cations, which exhibits antimicrobial (including antiviral) character in the absence of applied energy or chemical oxidants;

"perovskite" means a material with a crystal structure similar to that of calcium titanium oxide (calcium titanate, $CaTiO_3$, a naturally occurring mineral commonly referred to as perovskite), of the formula $ABO_3$, in which A is alkali metal, alkaline earth metal, or lanthanide element, and in which B is transition metal;

"spinel" means a member of a class of minerals with the general formula $AB_2X_4$ which crystallize in the cubic system, wherein X anions (typically chalcogens, such as oxygen and sulfur) are arranged in a cubic close-packed lattice, and cations A and B (typically metals), occupy some or all of the octahedral and tetrahedral sites in the lattice, wherein A and B can be different metals or the same metal in two different oxidation states;

"substrate" means a surface, substance, material, physical object, or structure, that in use may be or become contaminated by the presence of microorganisms therein and/or thereon, e.g., dyes, pharmaceuticals, and surfaces, substances, materials, physical objects, and structures that may be subject to fouling or impairment by microorganisms; and "transition metal" means an element whose atom has a partially filled d sub-shell, or that can give rise to cations with an incomplete d sub-shell, including the elements of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn), as well as actinium (Ac) and lanthanum (La) when satisfying the above d sub-shell criteria.

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure is set out herein in various embodiments, and with reference to various features and aspects of the disclosure. The disclosure contemplates such features, aspects and embodiments in various permutations and combinations, as being within the scope of the invention. The disclosure may therefore be specified as comprising, consisting or consisting essentially of, any of such combinations and permutations of these specific features, aspects and embodiments, or a selected one or ones thereof.

The present disclosure relates in various aspects to self-disinfecting antimicrobial materials, objects, structures, and assemblies, based on antimicrobial mixed metal oxide, mixed metal sulfide, or mixed metal oxysulfide, e.g., an antimicrobial perovskite, spinel, crystalline or semi-crystalline ceramic, or other antimicrobial mixed metal oxide, sulfide, or oxysulfide that is antimicrobially effective against a target microbial species, e.g., viruses, bacteria, and/or fungi, without external intervention (including light, heat, electricity, and/or chemical additives, although these external interventions may increase the antimicrobial properties of the disclosed materials). Mixed metal oxides, sulfides, and oxysulfides of the present disclosure demonstrate high activity against microbial species as well as superior stability. Perovskites form a class of advantageous mixed metal oxides of the present disclosure, with the perovskite crystal structure tolerating large distortions with respect to ideal $ABO_3$ cubic symmetry, allowing for a large variety of targeted metal substitutions at both A sites and B sites to provide desired antimicrobial properties. Similarly, because of their varied compositions, electron configurations, and valence states, have properties that can be adjusted by controlling their structure, composition, phase, valence, morphology, and defects. Spinel materials have similar properties.

In the practice of the present disclosure, lanthanum manganese oxides (LMOs) that are doped or partially substituted on lanthanum A-sites and/or manganese B-sites with other metal or metals form a particularly preferred category of antimicrobial materials whose antimicrobial properties may be enhanced by appropriate addition of alkali metal, alkaline metal, transition, and/or main group metals to control lattice structure in the material and yield specific valence states that optimize antimicrobial properties. The present disclosure also contemplates enhancement of the antimicrobial properties of mixed metal oxides, sulfides, and oxysulfides such as LMOs, other perovskites, and spinels, etc. by modifications of particle size, particle size distribution, surface area, and/or particle shape. The use of antimicrobial mixed metal oxides, sulfides, or oxysulfides in fomites according to the present disclosure is capable of achieving fast, continuous (disinfecting) inactivation of viruses, bacteria, fungi and other microbial agents contacting the surfaces of such fomites, e.g., a greater than 1 log decrease in viable virus in less than 15 minutes at ambient temperatures of 15-35° C. Such inactivation is achieved independently of conditions of illumination and humidity at such ambient temperature levels. Further, since the antimicrobial mixed metal oxides, sulfides, and oxysulfides of the present disclosure are morphologically and tribologically robust in character, such materials are highly stable in the environment and resilient to repeated contact and cleaning operations.

Embodiments of the disclosure include disinfecting surface coatings in which the antimicrobial mixed metal oxide, mixed metal sulfide, or mixed metal oxysulfide is incorporated in and/or on the surface coating, so that the coating provides a substrate for the dispersed or overcoated antimicrobial mixed metal oxide, mixed metal sulfide, or mixed metal oxysulfide. The coating may be of any suitable material, and may for example be of a polymeric composition or other natural or synthetic film-forming material that is effective to present the associated antimicrobial mixed metal oxide, mixed metal sulfide, or mixed metal oxysulfide for contact with microbial species at and/or in the surface coating. In particular implementations, the coating in which the antimicrobial mixed metal oxide, mixed metal sulfide, or mixed metal oxysulfide is incorporated may be a chemical agent resistant coating (CARC) material, or other suitable coating material of appropriate character. The coating may be of any suitable thickness and film characteristics, e.g., hydrophilic, hydrophobic, amphiphilic, or inert character, and may have any suitable porosity and pore size distribution, or alternatively a void-free or substantially void-free character, and surface roughness or smoothness as may be desired for specific applications, for example to facilitate adsorption or adhesion of a microbial pathogen followed by inactivation of the pathogen by the mixed metal oxide, sulfide, or oxysulfide material.

Other embodiments include composite materials in which the substrate, e.g., a fomite substrate, is a matrix (continuous phase) material in the composite and the mixed metal oxide, sulfide, or oxysulfide is a discontinuous phase material therein, e.g., being present throughout the bulk volume of the matrix material and at surfaces of the composite. The matrix material may be of any suitable type, and may for example comprise a ceramic, polymeric, metal, carbon, or other suitable material. In specific illustrative embodiments, the matrix material may be vitreous carbon, silicon carbide, boron carbide, alumina, graphite, epoxy, phenolic, polycarbonate, or the like. Similar considerations to those applicable to coatings may be germane to the characteristics of the matrix material in the composite, such as porosity or surface roughness or smoothness to facilitate adsorption or adhesion of a microbial pathogen followed by inactivation of the pathogen by the mixed metal oxide, sulfide, or oxysulfide material.

It is thought that the antimicrobial mixed metal oxides, sulfides, and oxysulfides of the present disclosure exhibit surface reactivity with amino acid residues of microbial pathogens, and thus do not require specific proteins, lipid molecules, or gene sequences in order to be effective. The antimicrobial mixed metal oxides therefore enable broad spectrum inactivation across extensive categories of viruses, bacteria, fungi, and other microbial species.

Accordingly, the disclosure contemplates incorporation of antimicrobial mixed metal oxides, sulfides, and oxysulfides into a wide variety of coating materials that can be sprayed, painted, dipped, etc. to provide disinfecting surfaces on a wide variety of substrates. The mixed metal oxides, sulfides, and oxysulfides are sufficiently thermally stable to be thermal sprayed and/or plasma sprayed onto substrates. The mixed metal oxides, sulfides, and oxysulfides in other embodiments may be incorporated in woven as well as in non-woven mats, webs, textiles, and fabrics, in the form of coatings, impregnated powders, nanowires, or other incorporated forms. In a particular variety of embodiments, the mixed metal oxides, sulfides, and oxysulfides of the present disclosure may be incorporated in materials of construction of personal protective equipment, such as facemasks, gloves, and the like, which are utilized as barrier articles to reduce risk of exposure and transmission of microbial pathogens.

The antimicrobial materials of the present disclosure may constitute or be comprised in antiviral compositions, articles, objects, structures, or assemblies that include corresponding substrates with which the antimicrobial mixed metal oxide, sulfide, or oxysulfide of the disclosure is associated to effect antimicrobial activity in and/or on such associated substrate. The substrate may be of any suitable type, and may for example comprise in specific embodiments (i) hospital, medical, and healthcare substrates, as for example, gowns, masks, gloves, surgical instruments, medical instruments, and hospital/medical facilities fixtures, furnishings, and disposables, (ii) food and beverage substrates, (iii) processing, packaging, and storage equipment, materials, and facilities, (iv) heating, ventilation, and air conditioning system substrates, including equipment, filters, ducting, monitoring devices and controls, (v) hardware substrates, e.g., doorknobs, latches, locks, handles, sinks, faucets, toilets, etc., (vi) textile and furniture substrates, (vii) transportation substrates, including land vehicles, aircraft, and watercraft such as ships, barges, and marine vessels, and their components and substructures, (viii) paint and coating substrates, including paint and coating formulations in pre-application and post-application (cured as well as uncured) forms, and (ix) construction and building substrates, including counters, cabinets, moldings, millwork, appliances, walls, windows, doors, flooring, and plumbing. The foregoing listing of such substrates is merely illustrative of the vast spectrum of substrates that may be utilized in the practice of the present disclosure.

In various embodiments, the substrates with which the antimicrobial mixed metal oxide, sulfide, or oxysulfide is associated are fomite substrates, but the disclosure is not limited thereto, and other non-fomite substrates may be utilized, e.g., roofing tiles for anti-fouling coatings or anti-fungal coatings.

The antimicrobial mixed metal oxides, sulfides, and oxysulfides of the present disclosure may be prepared in various embodiments by mixing of starting materials, followed by calcining of the mixed materials in air or other toxic gaseous medium, and milling to break up aggregates and to adjust particle size and particle size distribution characteristics of the antimicrobial mixed metal oxide, sulfide, or oxysulfide. Essentially 100% yields are readily achievable in such processes. Process equipment for manufacture of mixed metal oxides may in various embodiments include continuous mixers, rotary tube furnaces, and bead mills.

In the antimicrobial mixed metal oxide, sulfide, or oxysulfide synthesis by solid state reactions, the oxide precursors, typically metal oxides, nitrates, and/or carbonates, or corresponding sulfide or oxysulfide precursors are mixed in stoichiometric amounts and heated to temperature in a range of from 600° C. to 1200° C. in a furnace under toxic (e.g., air, oxygen, oxygen-enriched air, or other oxygen-containing gas) conditions, with the particle size and morphology being controlled by milling before and/or after calcining. The synthesis cycle is typically 12-24 hours in duration. Solid-state synthesis is advantageously employed to produce micron-sized to millimeter-sized, or larger, antimicrobial mixed metal oxide, sulfide, or oxysulfide particles.

Alternatively, wet chemical, hybrid solid-state/wet chemical, and sol-gel synthetic methods can be employed to produce antimicrobial mixed metal oxides, sulfides, and oxysulfides in nanosized particle forms.

In various embodiments of the present disclosure, modified lanthanum manganese oxides may be employed, in which the lanthanum manganese oxide is modified by elemental substitution and/or control of particle size and/or shape. Addition and substitution of targeted metal atoms can be used to manipulate the mixed metal oxide, sulfide, or oxysulfide lattice and provide enhanced active valence states that are effective for inactivation of microbial species.

The disclosure relates in various aspects to an antimicrobial material comprising a substrate, e.g., a fomite substrate, and an antimicrobial mixed metal oxide, sulfide, and/or oxysulfide in and/or on the substrate, subject to the conditions that: (i) when the antimicrobial mixed metal oxide is a lanthanum manganese oxide of the formula $La_xMnO_3$, x does not exceed 0.85; and (ii) the antimicrobial mixed metal oxide is not magnesium ferrite. The antimicrobial material may be constituted, with the mixed metal oxide, sulfide, or oxysulfide dispersed in the substrate and/or in a surface coating on the substrate, or the antimicrobial material may be constituted in the form of a structural composite of the substrate and the mixed metal oxide, sulfide, and/or oxysulfide.

The substrate, e.g., a fomite substrate, in such antimicrobial material may be or comprise a textile, mat, web, clothing article, furniture article, furnishing article, building structure, building material, transportation vehicle, handheld article, machine, counter, cabinet, building fixture, coating, powder, or packaging material. The substrate may comprise surface to which the antimicrobial mixed metal oxide imparts antimicrobial surface character.

Antimicrobial mixed metal oxide, sulfide, and oxysulfide materials of the present disclosure may comprise a perovskite with a B-site transition metal including at least one of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn). In various embodiments, the perovskite may comprise a B-site transition metal including at least one of cobalt, nickel, and manganese.

Antimicrobial mixed metal oxides, sulfides, and oxysulfides of the disclosure may be of any suitable type. In various embodiments, the antimicrobial mixed metal oxide may for example be an antimicrobial lanthanum manganese oxide such as $La_{0.8}Sr_{0.2}MnO_3$, $La_{0.65}Sr_{0.35}MnO_3$, $La_{0.8}Sr_{0.2}Mn_{0.8}Cu_{0.2}O_3$, or $LaCoO_3$, or the antimicrobial mixed metal oxide may be a ternary or quaternary multi-metal oxide such as $Ca_{0.5}Sr_{0.5}Ni_xCu_{1-x}O_3$, where $x \leq 1$, or the antimicrobial mixed metal oxide, sulfide, or oxysulfide may be otherwise constituted, formed and incorporated in antimicrobial fomite or non-fomite surfaces, articles, objects, assemblies, structures, etc., as necessary or desirable in a given application or implementation of the disclosure. As a further example, the mixed metal oxide in various embodiments may comprise a potassium-doped lanthanum manganese oxide, such as for example $La_{0.6}K_{0.4}MnO_3$ or $La_{0.55}K_{0.45}MnO_3$.

The disclosure relates in another aspect to an antimicrobial coating material, comprising a film-forming composition and antimicrobial mixed metal oxide, sulfide, or oxysulfide dispersed therein, subject to the conditions that: (i) when the antimicrobial mixed metal oxide is a lanthanum manganese oxide of the formula $La_xMnO_3$, x does not exceed 0.85; and (ii) the antimicrobial mixed metal oxide is not magnesium ferrite. The film-forming composition may in specific implementations comprise polyurethanes, epoxies, silicones, polyamides, polyimides, acrylics, alkyds, fluorinated polymers, chlorinated polymers, or any other suitable film-forming resins or components. The film-forming composition may in various embodiments comprise a chemical agent resistant coating (CARC) material. The antimicrobial coating material may in various embodiments comprise the film-forming composition in mixture with the mixed metal oxide in a particulate form, as a cold spray formulation.

The disclosure further relates to a coating formed by application of any of the above-described antimicrobial coating materials of the disclosure to a surface of a substrate.

A further aspect of the disclosure relates to an antiviral surface of a surface-presenting substrate, e.g., a fomite substrate, comprising antimicrobial mixed metal oxide, sulfide, or oxysulfide at the surface as a component thereof, subject to the conditions that: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

Another aspect of the disclosure relates to a particulate antimicrobial material comprising a particulate core material in and/or on which an antimicrobial mixed metal oxide, sulfide, or oxysulfide is incorporated. The particulate core material may for example comprise silica, alumina, macroreticulate polymer, porous silicon, glass, or ceramic, or a particulate core material such as a metal, metal alloy, graphene, graphene oxide, or diatomaceous earth.

The disclosure relates in a further aspect to a method of inactivating a microorganism, comprising contacting the microorganism with the antimicrobial mixed metal oxide, sulfide, or oxysulfide, subject to the conditions that: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

The microorganism in such method may be of any suitable type and variety, as for example a virus such as an envelope virus, e.g., SARS-CoV-2 or vaccinia, a bacterium such as tuberculosis or anthrax, fungi such as *Candida albicans* or *Aspergillus*, or other microorganism. The contacting in such method may be conducted at a surface at which the mixed metal oxide, sulfide, or oxysulfide is present. The surface may be a fomite substrate surface, e.g., wherein the fomite substrate is a textile, mat, web, clothing article, furniture article, furnishing article, building structure, building material, transportation vehicle, handheld article, machine, counter, cabinet, building fixture, coating, powder, or packaging material.

The antimicrobial mixed metal oxide, sulfide or oxysulfide in such method may be of any suitable type appropriate to the contacting, e.g., an antimicrobial perovskite, spinel, crystalline or semi-crystalline ceramic, or other antimicrobial mixed metal oxide, sulfide or oxysulfide, subject to the conditions that: (i) when the antimicrobial mixed metal oxide is a lanthanum manganese oxide of the formula $La_xMnO_3$, x does not exceed 0.85; and (ii) the antimicrobial mixed metal oxide is not magnesium ferrite.

Although the disclosure herein is primarily directed to antimicrobial mixed metal oxides of varied character, the disclosure also contemplates and encompasses antimicrobial mixed metal chalcogenides. Such mixed metal chalcogenides may be of any suitable type, and may for example comprise antimicrobial mixed metal sulfides, antimicrobial mixed metal oxysulfides, antimicrobial mixed metal selenides, mixed metal tellurides, etc.

Referring now to the drawings, FIG. 1 is a plot of viral inactivation versus average manganese oxidation state for the lanthanum manganese oxide compounds $La_xMnO_3$ wherein x=1, 0.95, and 0.9, described in Weng, et al., "Spontaneous and continuous anti-virus disinfection from nonstoichiometric perovskite-type lanthanum manganese oxide", Progress in Natural Science: Materials International 25 (2015) 191-196, for inactivation of A/PR/8/34H1N1 influenza A virus (PR8) with a contact time of 15 minutes at room temperature, and for representative strontium-substituted lanthanum manganese oxides $La_{0.8}Sr_{0.2}MnO_3$ and $La_{0.65}Sr_{0.35}MnO_3$ of the present disclosure against thermally stable vaccinia virus (VACV, a surrogate for smallpox) with a 5 minute contact time at room temperature.

As shown by the data in FIG. 1, the lanthanum manganese oxides of Weng, containing only lanthanum and manganese as metals thereof, exhibit inferior levels of viral inactivation, with $LaMnO_3$ achieving only about 58% viral inactivation after 15 minutes of exposure, $La_{0.95}MnO_3$ achieving only about 67% viral inactivation after 15 minutes of exposure, and $La_{0.9}MnO_3$ achieving only about 77.5% viral inactivation after 15 minutes of exposure. Thus, although successively increased levels of manganese average oxidation state produced higher respective levels of viral inactivation, the overall levels of viral inactivation were low and substantial active virus remained even after prolonged contact of 15 minutes with the lanthanum manganese oxides containing only lanthanum and manganese metals.

By contrast, the antiviral effect achieved by the antimicrobial mixed metal oxides $La_{0.8}Sr_{0.2}MnO_3$ and $La_{0.65}Sr_{0.35}MnO_3$ of the present disclosure achieved substantially complete (98% and >99.9%) inactivation of the contacted virus after only 5 minute contact time at room temperature. The antimicrobial lanthanum manganese oxides of the present disclosure containing additional substituent metal (in this case, strontium) effected essentially total inactivation of virus, evidencing a strikingly superior and unexpected antimicrobial effect in relation to the lanthanum manganese oxide compounds $La_xMnO_3$ wherein x=1, 0.95, and 0.9, as described in Weng.

In the FIG. 1 plot, the data for $La_{0.65}Sr_{0.35}MnO_3$ and $La_{0.8}Sr_{0.2}MnO_3$ showed them to be far more active than expected in view of the data for $LaMnO_3$, $La_{0.95}MnO_3$, and $La_{0.9}MnO_3$, and if the data for $LaMnO_3$, $La_{0.95}MnO_3$, and $La_{0.9}MnO_3$ are extrapolated, then $MnO_2$ with a manganese oxidation state of +4 would be expected to demonstrate high antiviral activity, but data in the archival literature involving $MnO_2$ nanosheets showed limited antibacterial activity toward *Salmonella, E. coli* or *B. subtilis.*

Accordingly, when all available data are considered, such aggregated data do not support a direct correlation of average manganese oxidation state to antimicrobial activity. When the electronic and magnetic properties of doped $LaMnO_3$ mixed metal oxides are considered, other factors emerge as relevant to the antimicrobial character of the mixed metal oxides. For example, when the amount of generated oxygen produced (in mmol/g h) is considered as a function of the average manganese oxidation state in $La_xSr_{(1-x)}MnO_3$, it is observed that oxygen production peaks at a manganese oxidation state of +3.3. When electrical conductivity of $La_xSr_{(1-x)}MnO_3$ (in $10^3$/W m) is considered as a function of the average manganese oxidation state, it is observed that electrical conductivity peaks at approximately +3.4. Similarly, the Curie temperature in both $La_xSr_{(1-x)}MnO_3$ and $La_xK_{(1-x)}MnO_3$ is observed to be a maximum at an average manganese oxidation state of approximately +3.3. None of these properties are observed to be a monotonic function of average manganese oxidation state, and the disclosure of Weng correspondingly fails to provide a derivative basis for the antimicrobial mixed metal oxides of the present disclosure.

Particle size and synthesis conditions of mixed metal oxides both play a role in surface defects, with smaller particles exhibiting more surface defects, while faster heating rates may cause incorporation of impurities on the surface and/or in the lattice of the mixed metal oxide, which can lower the excess surface oxygen and correspondingly the activity of the mixed metal oxide. Due to such added defects, surface stoichiometry may differ from that of the bulk mixed metal oxide. These factors are properly considered in the preparation of the mixed metal oxides to maximize their utility for pathogen inactivation. It therefore is to be appreciated that optimal perovskite particle sizes and particle size distributions may be empirically determined, by appropriate synthesis of respective perovskites having varying characteristics of such type, followed by screening of the respective perovskites in microbial challenge assays, such as the microbial challenge assays hereinafter described, to select perovskite particle sizes and particle size distributions that provide the desired nature and extent of antimicrobial activity. In like manner, synthesis processes may be empirically varied to produce corresponding respective mixed metal oxides, sulfides and oxysulfides that then may be characterized and selected on the basis of their antimicrobial activities.

Accordingly, the antimicrobial materials of the present disclosure may be functionally designed and empirically verified, to provide antimicrobial materials having a desired composition, stoichiometry, and defect density, as effective to combat the target microbial species. In such efforts, desired surface and bulk stoichiometry, defects, and other characteristics may be selectively modified by corresponding choice of process conditions, e.g., in the heat treatment of the mixed metal oxide, sulfide or oxysulfide, in the selection of the calcining atmosphere (e.g., selection of oxidizing or reducing atmospheres). In various embodiments, the mixed metal oxide, sulfide or oxysulfide may be provided in graded coatings for efficacy and to accommodate, for example, thermal cycling and other variable conditions. The antimicrobial mixed metal oxide, sulfide or oxysulfide may be provided in the corresponding antimicrobial material with chemical activation synergists and other active ingredients. For example, the antimicrobial material may be formulated with the antimicrobial mixed metal oxide, sulfide or oxysulfide in combination with other antimicrobial ingredients, such as nano-silver, quaternary ammonium compounds, cuprous oxide, etc., to enhance the performance of the antimicrobial material. In various embodiments, the antimicrobial materials of the present disclosure may be formulated as anti-fouling coatings for specific end-use environments.

The mixed metal oxides, sulfides or oxysulfides in the antimicrobial materials of the present disclosure may range in particle size from nanoscale, e.g., as synthesized by sol-gel synthesis or other appropriate techniques, up to and exceeding micron- and millimeter-scale particles, e.g., as synthesized by solid-state reactions. Smaller particles exhibit higher surface area per mass, and correspondingly may afford better material utilization, but smaller particles may tend to have a greater level of surface defects and may be more reactive than larger particles, and larger particles may be easier to handle, in the preparation of the desired antimicrobial material. Particle size distribution may be selectively tailored to provide appropriate processing and performance characteristics. In this respect, approximately uniform particle size distributions may provide better mixing behavior in formulation of antimicrobial compositions, while multimodal particle size distributions may be desired in other applications to achieve higher packing fractions and denser films.

Particle shape may also be selectively controlled to provide a desired antimicrobial product, with particle shape affecting reactivity and packing of mixed metal oxide, sulfide or oxysulfide particles. The mixed metal oxide, sulfide or oxysulfide particles may be produced in any suitable form. In specific embodiments, the mixed metal oxide, sulfide or oxysulfide particles may be utilized in the form of spheres, rods, plates, or other geometrically regular or irregular forms, the selection of which may be made to achieve exposure of different metal/oxide ions on the surface of the particles.

In embodiments in which the mixed metal oxide, sulfide or oxysulfide is incorporated in a coating or a film as the substrate, the substrate coating formulation or film-forming composition may comprise any suitable ingredients, such as for example binders, carriers, resins, solvents, leveling agents, fillers, surface active agents, hydrophilicity- or hydrophobicity-imparting agents, antioxidants, curing agents, cross-linking agents, stabilizers, pigments, adhesion promoters, surfactants, and/or any other ingredients that may be selected for constituting a suitable coating or film for a given end-use product material, article, object, structure, etc. Pure as well as blended, composite, and multilayered coatings and films may be suitably formulated as a substrate for the antimicrobial mixed metal oxide, sulfide or oxysulfide. Coatings and films may be applied to materials, articles, objects, structures, or other foundational base, component, precursor, starting material, substructure or subassembly, in forming or finishing a product having the desired antimicrobial character.

Coatings and films formulated to contain the mixed metal oxide, sulfide or oxysulfide may be deposited by any suitable application techniques, as for example by cold spray, thermal spray, plasma spray, spin coating of precursors, dip coating, spray coating, painting, roller coating, and the like, although the disclosure is not limited thereto.

Coating and film formations may contain any suitable amounts of the antimicrobial mixed metal oxide, sulfide or oxysulfide that are efficacious to provide a desired antimicrobial character in the product coating or film. Accordingly, mass ratios of mixed metal oxides, sulfides or oxysulfides in formulations for such coatings and films may be widely varied, to provide antimicrobial mixed metal oxide, sulfide or oxysulfide levels in the product coating or film that may range from levels as low as 0.05% or lower, up to levels of or approaching 100%, based on total mass of the product coating or film. For example, thermal spray, plasma spray, and cold spray techniques can yield mixed metal oxide coatings that are 100% ceramic in character. In various embodiments, the mass ratios may range from 0.05% to 100%, (in the latter case, the mixed metal oxide, sulfide or oxysulfide may for example be deposited from a formulation including the mixed metal oxide, sulfide or oxysulfide and a volatile or otherwise subsequently removable carrier that may be correspondingly removed, e.g., by heat exposure, radiation exposure, dissolution, etc.), although the disclosure is not limited thereto, and other ranges or sub-ranges may be applicable to specific coatings and films.

Coating and film formulations containing the mixed metal oxide, sulfide or oxysulfide may be formulated as necessary or appropriate, to provide specific desired product coating and product film characteristics, such as for example density, porosity, hydrophilicity or hydrophobicity, surface charge, thickness, or other (e.g., physical, chemical, morphological, etc.) characteristics.

In various embodiments, dense coatings and films may be desired for protection of an underlying material, article, object, or structure. In various embodiments, porous coatings and films may be porous to enable penetration by pathogens to increase their exposure to the antimicrobial mixed metal oxide. In various embodiments, multilayer coatings and films may be employed, e.g., including a primer/bottom coat layer for protection of an underlying substrate either with or without antimicrobial mixed metal oxide therein, and a topcoat layer containing antimicrobial mixed metal oxide, sulfide or oxysulfide, in which the topcoat layer can be porous or non-porous in character.

In various embodiments, hydrophilic coatings and films containing the antimicrobial mixed metal oxide, sulfide or oxysulfide may be employed, and/or hydrophilicity-imparting agents may be overcoated on such coatings and films. Hydrophilic surfaces shorten the distance through which microbes must travel, and therefore correspondingly shorten the time of travel, before reaching a mixed metal oxide, sulfide or oxysulfide active site at which the microbe can be inactivated. Hydrophilic surfaces also decrease the time for water droplet evaporation, and thus may enhance the rate of microbial inactivation.

In other embodiments, hydrophobic coatings and films containing the antimicrobial mixed metal oxide, sulfide or oxysulfide may be employed, and/or hydrophobicity-imparting agents may be overcoated on such coatings and films, such as oleic acid, stearic acid, fluorinated compounds, and the like.

With respect to coatings and films and other surface-comprising substrates for the antimicrobial mixed metal oxide, sulfide or oxysulfide, surface roughness may also have an effect on the antimicrobial character of the mixed metal oxide, sulfide or oxysulfide at such surfaces, as for example may be associated with capillarity or wettability characteristics of the surface. It may therefore be advantageous in various implementations of the present disclosure to empirically determine roughness averages (Ra values measuring microscopic peaks and valleys of the surface) or root mean square (RMS) roughness characteristics of varied surface samples incorporating the mixed metal oxide, sulfide or oxysulfide, in order to determine a most beneficial surface micromorphology for achieving a desired antimicrobial character of the surface containing the antimicrobial mixed metal oxide, sulfide or oxysulfide.

In the formulation of compositions comprising the antimicrobial mixed metal oxide, sulfide or oxysulfide, it may be advantageous to utilize inert carrier substrates, on which the antimicrobial mixed metal oxide is deposited. Carrier substrates may include materials such as silica, alumina, macroreticulate polymers, porous silicon, etc., on which antimicrobial mixed metal oxides, sulfides or oxysulfides may be deposited by solution deposition or other suitable deposition techniques, optionally followed by calcining or other post-deposition processing operations. Such techniques increase the antimicrobial mixed metal oxide utilization since most antimicrobial mixed metal oxide, sulfide or oxysulfide material is on the surface of the carrier substrate. The inert carrier may be selected for the provision of high surface area, to maximize presentation of the antimicrobial mixed metal oxide, sulfide or oxysulfide deposited on the carrier. Use of inert carriers may also be of advantage in lowering the cost of the ultimate antimicrobial product by use of cheaper inert carrier substrates.

In the formulation of compositions comprising the antimicrobial mixed metal oxide, sulfide or oxysulfide, it may also be advantageous to utilize active carrier substrates, on which the antimicrobial mixed metal oxide is deposited. In addition to possessing the advantages noted above for inert carrier substrates, active substrates may be to provide adjunctive or synergistic activity for enhanced antimicrobial character. Active carrier substrates may be of any suitable type. As an example, the active carrier substrate may comprise a metal, graphene, or graphene oxide to modify or otherwise affect the electronic structure of the antimicrobial mixed metal oxide, sulfide or oxysulfide.

As another example, the active carrier substrate on which the antimicrobial mixed metal oxide, sulfide or oxysulfide is deposited may comprise diatomaceous earth, which is readily available in particle sizes ranging from less than 3 μm to more than 1 mm, as for example particle sizes in a range of from 10 to 200 μm, and has a low density and high porosity. Diatomaceous earth has substantial antimicrobial, e.g., antiviral utility, and by virtue of its negative charge, diatomaceous earth is highly effective in attracting, absorbing and trapping microorganisms exhibiting positive charges, including SARS-CoV-2, which like other RNA viruses consists of a negatively charged RNA envelope in a positively charged capsid. Accordingly, the antimicrobial mixed metal oxide, sulfide or oxysulfide may be solution-deposited or otherwise applied to the diatomaceous earth particle substrate, and the antimicrobial mixed metal oxide-, sulfide- or oxysulfide-impregnated diatomaceous earth particles may then be dispersed in a resin or binder and applied to an underlying substrate, to provide an antimicrobial and antiviral surface, e.g., for a countertop, cabinet, smart phone casing, or other fomic surface-presenting material, article, object, structure, assembly, etc. Other substrate materials exhibiting negatively charged surface include hydrous aluminous phyllosilicates, kaolinite, illite, and the like, but the disclosure is not limited thereto.

Additional approaches can be taken to provide a specific surface charge on a surface of a fomic surface-presenting material, or on specific surface regions thereof. For example, the surface of the fomic surface-presenting material may be patterned, e.g., in a checkerboard or banded pattern, with respective discrete positive surface charge regions and negative surface charge regions on the surface incorporating the antimicrobial mixed metal oxide, sulfide or oxysulfide, so that the mixed metal oxide, sulfide or oxysulfide is antimicrobially effective against pathogens exhibiting positive charges as well as against pathogens exhibiting negative charges. Substrate materials exhibiting positively charged surfaces include cationic polymers, glasses, nylon, and the like, but the disclosure is not limited thereto.

The present disclosure, in addition to use of specific substrate materials to provide electrostatic interactions to accelerate pathogen inactivation, also contemplates modification of the antimicrobial mixed metal oxide, sulfide or oxysulfide to provide desired surface charge characteristics, by appropriate doping and substitution of the mixed metal oxide.

Extrinsic effects may also be used to enhance the antimicrobial character of the mixed metal oxide, sulfide or oxysulfide associated with the substrate. For example, electromagnetic activation may be employed to exploit the visible light bandgap of a specific mixed metal oxide, sulfide or oxysulfide to photo-generate additional surface-reactive components that enhance antimicrobial activity of the mixed metal oxide, sulfide or oxysulfide associated with the substrate. Accordingly, UV radiation, infrared radiation, and other electromagnetic radiation may be employed with antimicrobial materials of the present disclosure, to provide electromagnetic activation enhancement of the material. Electrical activation may also be employed in various antimicrobial materials of the present disclosure, utilizing electrochemistry to generate additional surface-reactive species, e.g., electrical activation involving interactions between solvent and electrolyte components to generate reactive species enhancing the antimicrobial activity of the mixed metal oxide, sulfide or oxysulfide associated with the substrate. As a further modality for enhancement, thermal activation may be employed to effect reactive processes involving the mixed metal oxide, sulfide or oxysulfide or substrate components of the antimicrobial and antiviral materials of the present disclosure, so that heat energy input is selectively applied to the antimicrobial material to enhance its antimicrobial character.

It will therefore be appreciated that a wide variety of extrinsic effects may be employed to achieve enhancement of the antimicrobial character of the materials of the present disclosure, and that the antimicrobial mixed metal oxides, sulfides or oxysulfides utilized in such materials may be specifically designed and constituted to accommodate such extrinsic effects in an adjunctive, interactive, or synergistic manner.

Although the disclosure herein is directed in various aspects to the use of antimicrobial mixed metal oxides, sulfides or oxysulfides in materials for antimicrobial inactivation of pathogens, the materials of the present disclosure may also be utilized in other applications, such as for decomposition of dyes, antibiotics, and other impurities beyond pathogens.

Antimicrobial mixed metal oxides, sulfides or oxysulfides may be utilized in materials in accordance with the present disclosure as a single mixed metal oxide, sulfide or oxysulfide species, or as mixtures, blends, and combinations of different mixed metal oxides, sulfides or oxysulfides. For example, a surface coating may be formulated comprising a resin carrier or binder containing one or more than one mixed metal oxide, sulfide or oxysulfide, e.g., a resin coating composition having dispersed therein a mixture of substituted lanthanum manganese oxide compounds. Thus, a combination of different antimicrobial mixed metal oxide, sulfide or oxysulfide species may be incorporated in an antimicrobial material, e.g., wherein each antimicrobial mixed metal oxide, sulfide or oxysulfide is selectively targeted to a different and distinct pathogen or group of pathogens in relation to the other mixed metal oxide(s), sulfide(s) and/or oxysulfide(s) therein, or wherein the combination of mixed metal oxides, sulfides and/or oxysulfides aggregately produces an enhanced antimicrobial activity, in relation to the activity provided by corresponding levels of the individual components or lesser combinations of individual components. In addition, non-mixed-metal oxide, sulfide or oxysulfide compounds containing elements of the mixed metal oxide compounds may be provided as a component of the mixed metal oxide-, sulfide-, or oxysulfide-containing material, where advantageous to improve the functional performance of the mixed metal oxide. As an illustrative example, a material containing $La_{0.8}Sr_{0.2}Mn_{0.8}Cu_{0.2}O_3$ may also contain any of corresponding non-mixed-metal oxide metal compounds, such as for example CuO, $MnO_2$, SrO, and/or $La_2(CO_3)_3$.

Concerning physicochemical properties of specific mixed metal oxides, sulfides or oxysulfides of the present disclosure, it is to be appreciated that lanthanum manganate derivatives, and other mixed metal oxides, sulfides and oxysulfides described herein, are air-, water-, and thermally (to >500° C.) stable. Many are strong, with Young's modulus, a measure of their stiffness, being on the order of 100 gigapascals (GPa), and particles ranging in size from nano- to micron-scale can be synthesized by solution processes and solid-state processes. Powders of such mixed metal oxides, sulfides or oxysulfides can be constituted in or on a variety of substrate articles, objects, structures, and materials. For example, the powders can be incorporated in woven and/or non-woven fabrics to impart antiviral properties to filters, masks, cloth, etc. The mixed metal oxide, sulfide or oxysulfide powder can be mixed with binders for spraying, dipping, or painting on a variety of surfaces, blended into polymers and plastics, and even plasma sprayed on metal substrates.

The antimicrobial activity of these and other mixed metal oxides, sulfides and oxysulfides of the present disclosure does not require UV light, although UV and visible light may further enhance antimicrobial activity due to the low bandgap (e.g., <2 electron volts (red spectrum)) character of many of the mixed metal oxides. The mixed metal oxides, sulfides and oxysulfides of the disclosure function to break down organic molecules in repeated cycles at room temperature. In addition, mixed metal oxides, sulfides and oxysulfides of the present disclosure are antimicrobially effective against a variety of bacterial strains, including *Micrococcus varians, Bacillus* spp, *Serratia* spp, and *Aspergillus* spp, and exceed specifications for anti-bacterial copper surfaces of 3 log decrease of bacterial activity in one-hour exposures.

While we do not wish to be bound by any theory or hypothesis as regards the mechanism and mode of action of the mixed metal oxides, sulfides or oxysulfides of the present disclosure, there is evidence that mixed metal oxides, sulfides and oxysulfides of the present disclosure form reactive oxygen species such as singlet oxygen and hydroxyl and dioxygen radicals on their surfaces in the presence of organic moieties, air (oxygen), and water (e.g., moisture and humidity). The mixed metal oxide, sulfide or oxysulfide is not consumed in the process. The reactive sites are continuously regenerated, and the mixed metal oxide can be cycled many times. The reactive surface oxygen species on the mixed metal oxide, sulfide or oxysulfide may react with amino acid residues such as histidine, tryptophan, tyrosine, methionine, cysteine, and arginine, each of which has an aromatic ring or a reactive sulfur-carbon bond that renders it susceptible to oxidative action by the mixed metal oxide, sulfide or oxysulfide.

Although the full range of microbial inactivation mechanisms associated with the mixed metal oxides of the present disclosure have not been conclusively established, the highly reactive oxygen species generated by mixed metal oxides, sulfides or oxysulfides in the presence of toxic gases and ambient moisture may also have an antiviral lytic or penetrative effect on the viral envelope and may additionally damage the genetic material inside the viral envelope.

It is to be noted that reactive oxygen intermediates can also cleave polypeptide chains and induce formation of cross-linked protein aggregates. If the reactive oxygen intermediates are present at sufficiently high concentration, proteins containing such polypeptide chain building blocks will be damaged at these active sites. Polysaccharides, like glycans, can also be dissociated by highly active radicals.

The mixed metal oxides, sulfides or oxysulfides in the mixed metal oxide-, sulfide-, or oxysulfide-containing materials of the present disclosure will adsorb between 1.5 and 3 monolayers of water from the ambient under normal temperature and relative humidity conditions. Water dissociation in that first monolayer to form adsorbed hydroxyl ions and protons is facilitated by hydrogen bond-formation with surface oxygen sites (*O). The surface concentration of adsorbed OH groups is typically 5-10/$nm^2$. Since the mixed metal oxide, sulfide or oxysulfide contains both active metal sites (*M), oxygen vacancies (□), and adsorbed hydroxyl ions ($HO^{-}_{ads}$), the ads, dissociative adsorption of oxygen leads to the formation of several types of reactive oxygen species including singlet oxygen, oxide, superoxide and peroxide ions, and hydroxyl radicals. The hydroxyl radicals can react to form hydrogen peroxide. Reactive oxygen species can be long-lived and interact with molecules in solution without them binding directly to the ceramic surface of the mixed metal oxide, readily diffusing tens of microns and surviving for seconds. This is critical to the process in which the product molecules must diffuse away from the self-disinfecting perovskite-containing surface. Accordingly, reactive oxygen species are available to interact with microbes such as virus particles present both on the surface and in liquid droplets deposited on the mixed metal oxide-containing surface, e.g., from a sneeze or cough. The viral load a single sneeze or cough can be as high as 200,000,000 virus particles and the particles typically spread in a fairly uniform distribution with a cone angle of ~40°. Thus, at one-meter distance, there are 9000 virus particles per $cm^2$, but this is orders of magnitude less than the number of active sites on the surface of the antimicrobial mixed metal oxide (>$10^{15}$ active sites/$cm^2$) or the surface concentration of OH groups (typically 5-10×$10^{13}$/$cm^2$).

Concerning the antiviral action of mixed metal oxide-, sulfide- and oxysulfide-comprising materials of the present disclosure, the potential inactivation mechanisms of the mixed metal oxide, sulfide or oxysulfide have been discussed hereinabove, and reflect that a virus does not need to be destroyed in order to render it inactive, provided that disruption of key amino acids and/or their hydrogen bonding is achieved. Enveloped viruses, including SARS-CoV, MERS-CoV, influenza viruses, and pox viruses infect by attachment to host cell receptors through surface protrusions formed by glycoproteins that are susceptible to oxidative damage mediated by the mixed metal oxide, sulfide or oxysulfide. At low reactive oxygen species concentration, the virion membranes can maintain structural integrity, but surface glycoproteins are damaged, while at higher reactive oxygen species concentrations, the membrane is also compromised, but in both cases the virus is inactivated. The reactive oxygen species generated by the mixed metal oxide, sulfide or oxysulfide can additionally attack bacterial outer membranes, in providing a desired bactericidal action.

As previously mentioned, mixed metal oxides of the present disclosure when in the form of perovskite or spinel crystal structures tolerate large distortions with respect to ideal $ABO_3$ (or $AB_2O_4$) cubic symmetry, allowing for a large variety of substitutions in order to achieve desired redox properties. The valence of the B-site ion is a key factor controlling the redox properties of the oxide. This can be manipulated by targeted metal substitution on either, or both, of the A or B sites, and can also be controlled by creating a deficiency on the A site or the O site, as non-stoichiometric defects that nonetheless still yield single-phase material that is stable over time. Lattice parameters of the substituted perovskite or spinel can be estimated quite accurately using Vegard's Law.

The present disclosure contemplates a variety of approaches for enhancing $LaMnO_3$-based mixed metal oxides, including, for example:

(i) partial substitution of $La^{+3}$ (A site) with divalent metal (e.g., $Sr^{+2}$ or $Ca^{+2}$) and monovalent elements (e.g., $Na^+$ or $K^+$), e.g., to form mixed metal oxides such as $La_{0.65}Sr_{0.35}MnO_3$, $La_{0.65}Ca_{0.35}MnO_3$, $La_{0.35}K_{0.65}MnO_3$, and related compounds;

(ii) partial substitution of $Mn^{+3}$ (B site) with a divalent metal such as $Cu^{+2}$, e.g., to form mixed metal oxides such as $La_{0.8}Sr_{0.2}Mn_{0.8}Cu_{0.2}O_3$, with the introduction of copper providing a synergistic benefit for inactivation of bacteriophages as well as additional antiviral benefits as discussed more fully below; and (iii) formation of single-phase, stable, sub-stoichiometric $LaMn_{1+}O_x$ species.

Charge compensation techniques, e.g., incorporation of $Sr^{+2}$ and/or $Cu^{+1}$ in the mixed metal oxide lattice, can be used to significantly increase the fraction of $Mn^{+4}$ species in manganate mixed metal oxides, and to correspondingly increase their oxidation activity.

In other embodiments of the present disclosure, copper doping on the B-site may be employed in perovskites to provide antimicrobial effects of $Cu^{+2}/Cu^{+1}$ cations, e.g., in Mn- and Ni-based perovskites. In this respect, $Cu^{+2}$ functions as a mild oxidation center, and $Cu^{+1}$ activity is targeted to disulfide (S—S) bonds in proteins. The provision of $Cu^{+1}$ ions by the perovskite may correspondingly produce a significant disruption of the disulfide bonds and in turn a decrease in binding capability of the receptor binding domain to the ACE2 receptor, as an additional inactivating action of the perovskite on the SARS-CoV-2 virus.

As alluded to in the prior discussion, visible or ultraviolet light may perform an additional positive role in enhancing the reactivity and the self-regenerating properties of mixed metal oxides of the present disclosure, in combating SARS-CoV-2 and other pathogens. The bandgap of $LaMnO_3$ is only 1.7 eV, and therefore additional reactive oxygen species will be generated in the presence of red (or higher frequency) light—the number depending on its intensity. Doping/metal-ion substitution can change these bandgap values (e.g., the bandgap of $La_{0.2}Sr_{0.8}MnO_3$ is 1.95 eV (red-orange light, an increase of 0.25 eV from pure $LaMnO_3$), and light of appropriate wavelength may correspondingly be assistively used to generate electron-hole pairs on the surface of the mixed metal oxide, sulfide or oxysulfide in the antimicrobial composition, object, or structure, for enhanced antimicrobial efficacy.

The disclosure also relates in various aspects to robust self-disinfecting antimicrobial coatings formulated with antimicrobial mixed metal oxides, sulfides or oxysulfides in accordance with the present disclosure, in which the coating may be formulated for corrosion protection, tribological character, appearance, signature control, and ability to be cleaned and/or decontaminated. Such coatings are self-regenerating and self-disinfecting, and advantageously contain mixed metal oxide perovskite ceramics that are optimized for the inactivation of broad classes of viruses, bacteria, fungi, pernicious chemical agents, and environmental toxins, without the requirement of external intervention such as heat and/or light exposure.

Such robust coatings resolve issues involving conventional chemical agent resistant coatings (CARCs), which may provide outstanding abrasion, wear, and chemical resistance, but can only be decontaminated using highly corrosive oxidizers such as supertropical bleach. The mixed metal oxide, sulfide or oxysulfide ceramic materials of the present disclosure may be incorporated in such coatings in particulate form to increase the wear resistance and hardness of polymeric CARCs by providing high levels of interfacial contact between organic and inorganic phases in the coatings and thereby enhancing the performance of already tough coatings.

The present inventors have demonstrated that modified, mixed-metal oxides such as Sr-doped $LaMnO_3$ can inactivate human coronavirus HuCoV-NL63 20-fold in 15 minutes at room temperature conditions. Such mixed metal oxides may be blended in specific embodiments with polyurethane and polyacrylic binders and powders, as well as a variety of CARC materials and polymers, to form tough, adherent coatings on metal, plastic, glass, and wood surfaces. Such coatings are highly wear-resistant, and antimicrobial in character, and may be deposited by any suitable application techniques, as for example spray coating or cold spray techniques.

Such robust coatings may incorporate mixed metal oxide, sulfide or oxysulfide particles in any suitable size and size distribution, e.g., particles in a size range of from 50 nm to 1 micrometer or more, and particle size distributions may be selected to optimize packing density of the mixed metal oxide, sulfide or oxysulfide in the coating formulation.

In various coating embodiments, the mixed metal oxide, sulfide or oxysulfide may be blended with a resin or coating formulation powder to form a mixture that can be cold sprayed on metallic surfaces to form adherent, robust surface coatings. In cold spray technology, particles with sizes from tens of nanometers to tens of microns are accelerated to high velocities typically exceeding 1000 m/s by a supersonic compressed gas to impinge the particles on a substrate to form highly adherent films. No solvents are necessary, and deposition efficiency as high as 90% is readily achieved. This technique is particularly useful for polymeric materials that are insoluble, to deposit mixed metal oxide, sulfide or oxysulfide composite coatings on metal substrates.

As previously described herein, mixed metal oxides, sulfides or oxysulfides of the present disclosure are readily synthesized by solid-state synthesis. For example, for the synthesis of $La_xMMnO_3$, wherein $x \leq 1$, M is a metal other than lanthanum and manganese, and may be a dopant such as K, Sr, Cu, or other suitable dopant element, the synthesis may be carried out with measuring of stoichiometric amounts of $La_2O_3$ and $MnO_2$ and dopant oxides, carbonates, etc., which are mixed in a ball mill, with the milled mixture and being calcined in air at temperature up to 1000° C. to form $La_xMMnO_3$, followed by ball milling of the calcined material to generate a uniform particle size distribution, e.g., on the order of 1 μm in diameter. Such mixed metal oxides, sulfides or oxysulfides may also be formed by solution synthesis, which may for example involve a sol-gel process to synthesize particles of the $La_xMMnO_3$ material of appropriate diameter, e.g., particles on the order of 50 nm in diameter, with the synthesized material being calcined and subsequently ball milled to provide the desired mixed metal oxide powder.

The mixed metal oxide powder, such as $LaSr_{0.35}Mn_{0.65}O_3$, may then be blended with the coating formulation, such as a polyacrylic resin formulation, that then is applied to the substrate. Other coating formulations, such as polyurethane powder may be employed, with the mixed metal oxide powder, such as $LaSr_{0.35}Mn_{0.65}O_3$, being blended with the polyurethane powder and dry-coated on the substrate, e.g., at a mixed metal oxide concentration that may for example be in a range of from 2 to 15% by weight, based on the total weight of the resulting coating.

Robust coating formulations may be formulated with polymeric and/or inorganic additives, such as surfactants to control distribution of the perovskite in the coating and/or surface, additives for control of surface hydrophobicity and hydrophilicity, additives to enhance bonding to polymer matrix coating materials, functionalization of active material fluorinated or non-fluorinated constituents to ensure migration to the surface of the coating, additives such as metal nanoparticles, graphene/graphene oxide, carbon nanotubes, etc., to increase antimicrobial performance as well as to enhance mechanical and chemical properties of the coating. Mixed metal oxide, sulfide or oxysulfide particle coalescence in the coating is susceptible to control by choice of particle size and binder viscosity.

The mixed metal oxide-, sulfide-, and oxysulfide-containing coatings, e.g., CARC mixed metal oxide-containing coatings of the present disclosure, may be formulated to meet various specifications, including; adhesion determined by the method of ASTM D3359B in a range of from 4B to 5B; impact resistance determined by the method of ASTM D2794 in pound units that may be on the order of 40/20, 35/16, or other suitable value; flexibility determined by the method of ASTM D522 (no cracks) of ⅛" to ¼", a Taber Abrasion Resistance determined by the method of ASTM D4060 modified (H10 wheel/500 g) in a range of 0.45-0.8 mils at 750 cycles; and STB resistance conforming to the requirements of MIL-DTL-64159B.

Such coatings may be applied to any suitable substrates, including for example aluminum, brass, carbon steel, polymeric, ceramic, plastic, glass, wood, fabric and leather substrates, and high touch surfaces such as on handles, door knobs, armrests, screens, and vehicular interior and exterior surfaces.

In environments susceptible to the presence or incursion of pernicious chemical agents, such as for example sulfur mustard and VX, CARC coatings containing modified lanthanum manganese oxides in accordance with present disclosure may be utilized to detoxify such pernicious chemical agents by hydrolysis thereof on the surface of the modified lanthanum manganese oxides, e.g., oxides such as $LaSr_{0.35}Mn_{0.65}O_3$, utilizing hydroxyl groups and adsorbed water to provide detoxification.

Candidate mixed metal oxides, sulfides or oxysulfides can be screened for antimicrobial activity by microbial challenge assays, e.g., involving application of test viruses, bacteria, or fungi to candidate mixed metal oxide, sulfide or oxysulfide and non-treated (control) surfaces, followed by wash and collection from the surfaces, with recovered virus titers being tested in cellular assays, to assess the microbial activity of the candidate mixed metal oxide, sulfide or oxysulfide.

By way of example, a procedure of a type as illustratively described below may be employed for mixed metal oxide, sulfide or oxysulfide screening against the target viral species (HCoV-NL63, MCoV-icA59, and pseudotyped SARS-CoV-2 viruses, in this example), in an exemplary implementation of such screening approach.

In an illustrative procedure, a predetermined amount, e.g., 25 μl inocula containing $2.5\times10^3$ or $1\times10^5$ fifty-percent tissue culture infective dose ($TCID_{50}$) or transducing units (TU) of the test viruses, is deposited on treated and non-treated (control) surfaces and recovered at multiple intervals (0, 5, 10, 15, 20, and 120 min) by collection and washing with 1 ml of cell culture medium (DMEM). In some instances, virus will be spread while being deposited on surfaces to a predetermined small surface area to better simulate a contaminated surface, and then recovered by swabbing the surface with a small cotton swab tip that will then be immersed in 1 ml of DMEM. Recovered virus titers are immediately checked for infectivity by $TCID_{50}$ or TU endpoint titration assay on LLC-MK2 monkey cells (HCoV-NL63), murine L-929 cells (MCoV-icA59), or Vero E6 monkey cells (pseudotyped SARS-CoV-2), with treatments performed in triplicates and titers being compared to non-treated surfaces by repeated-measures ANOVA followed by one-sided multiple comparisons procedures.

Accordingly, the disclosure in one aspect relates to an antimicrobial material comprising a substrate, e.g., a fomite substrate, and an antimicrobial mixed metal oxide, sulfide or oxysulfide in and/or on the substrate, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite, and such antimicrobial material may in various embodiments comprise any one or more compatible additional features of the following: (1) the antimicrobial mixed metal oxide, sulfide or oxysulfide is dispersed in the substrate; (2) the antimicrobial mixed metal oxide, sulfide or oxysulfide is in a surface coating on the substrate; (3) in the form of a structural composite of the substrate and the antimicrobial mixed metal oxide, sulfide or oxysulfide; (4) the substrate is a textile, mat, web, clothing article, furniture article, furnishing article, building structure, building material, transportation vehicle, handheld article, machine, counter, cabinet, building fixture, coating, powder, or packaging material; (5) the substrate comprises surface to which the antimicrobial mixed metal oxide imparts antimicrobial character, wherein the surface has been or is coated to provide a hydrophilic character; (6) the antimicrobial mixed metal oxide, sulfide or oxysulfide comprises a perovskite including a B-site transition metal including at least one of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn); (7) the antimicrobial mixed metal oxide, sulfide or oxysulfide comprises a perovskite including a B-site transition metal including at least one of cobalt, nickel, and manganese; (8) the antimicrobial mixed metal oxide comprises $La_{0.8}Sr_{0.2}MnO_3$; (9) the antimicrobial mixed metal oxide comprises $La_{0.65}Sr_{0.35}MnO_3$; (10) the antimicrobial mixed metal oxide comprises $La_{0.8}Sr_{0.2}Mn_{0.8}Cu_{0.2}O_3$; (11) the antimicrobial mixed metal oxide comprises $LaMn_{1.1}O_x$ wherein x is <3; (12) the antimicrobial mixed metal oxide comprises $La_{0.6}K_{0.4}MnO_3$; (13) the antimicrobial mixed metal oxide comprises $La_{0.55}K_{0.45}MnO_3$; (14) the antimicrobial mixed metal oxide comprises $Ca_{0.5}Sr_{0.5}Ni_xCu_{1-x}O_3$; (15) wherein the antimicrobial mixed metal oxide comprises at least one of $La_{0.8}Sr_{0.2}MnO_3$, $La_{0.65}Sr_{0.35}MnO_3$, $La_{0.8}Sr_{0.2}Mn_{0.8}Cu_{0.2}O_3$, and $LaCoO_3$; (16) the antimicrobial mixed metal oxide comprises lanthanum manganese oxide (LMO) that is doped or partially substituted with other metal or metals; (17) the antimicrobial mixed metal oxide comprises lanthanum manganese oxide (LMO) that is doped or partially substituted with strontium; (18) the antimicrobial mixed metal oxide comprises lanthanum manganese oxide (LMO) that is doped or partially substituted with copper; (19) the antimicrobial mixed metal oxide comprises lanthanum manganese oxide (LMO) that is doped or partially substituted with strontium and copper; (20) the antimicrobial mixed metal oxide comprises lanthanum manganese oxide (LMO) that is doped or partially substituted with cobalt; (21) the antimicrobial mixed metal oxide comprises lanthanum manganese oxide (LMO) that is doped or partially substituted with potassium; (22) the antimicrobial mixed metal oxide comprises lanthanum manganese oxide (LMO) that is doped or partially substituted with nickel; (23) the antimicrobial mixed metal oxide comprises lanthanum manganese oxide (LMO) that is doped or partially substituted with strontium, nickel, and copper; (24) the antimicrobial mixed metal oxide comprises a doped lanthanum manganese oxide of the formula $La_xM_yMnO_z$ wherein M is a metal other than lanthanum and manganese, x and y are each independently between 0 and 1, and z is between 2 and 4, with the doped lanthanum manganese oxide being charge balanced, and with the proviso that when y=0, x<0.85; and (25) the antimicrobial mixed metal oxide is comprised in a coating on the substrate.

The disclosure in a further aspect relates to an antimicrobial coating material, comprising a film-forming composition and an antimicrobial mixed metal oxide, sulfide or oxysulfide dispersed therein, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite, and such antimicrobial coating material may in various embodiments comprise any one or more compatible additional features of the following: (1) the antimicrobial mixed metal oxide, sulfide or oxysulfide comprises a perovskite including a B-site transition metal including at least one of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn); (2) the antimicrobial mixed metal oxide comprises a perovskite including a B-site transition metal including at least one of cobalt, nickel, and manganese; (3) the antimicrobial mixed metal oxide comprises $La_{0.8}Sr_{0.2}MnO_3$; (4) the antimicrobial mixed metal oxide comprises $La_{0.65}Sr_{0.35}MnO_3$; (5) the antimicrobial mixed metal oxide comprises $La_{0.8}Sr_{0.2}Mn_{0.8}Cu_{0.2}O_3$; (6) the antimicrobial mixed metal oxide comprises $LaMn_{1.1}O_x$ wherein x is <3; (7) the antimicrobial mixed metal oxide comprises $La_{0.6}K_{0.4}MnO_3$; (8) the antimicrobial mixed metal oxide comprises $La_{0.55}K_{0.45}MnO_3$; (9) the antimicrobial mixed metal oxide comprises $Ca_{0.8}Sr_{0.2}Ni_xCu_{1-x}O_3$; (10) the antimicrobial mixed metal oxide comprises at least one of $La_{0.8}Sr_{0.2}MnO_3$, $La_{0.65}Sr_{0.35}MnO_3$, $La_{0.8}Sr_{0.2}Mn_{0.8}Cu_{0.2}O_3$, and $LaCoO_3$; (11) the antimicrobial mixed metal oxide comprises lanthanum manganese oxide (LMO) that is doped or partially substituted with other metal or metals; (12) the antimicrobial mixed metal oxide comprises lanthanum manganese oxide (LMO) that is doped or partially substituted with strontium; (13) the antimicrobial mixed metal oxide comprises lanthanum manganese oxide (LMO) that is doped or partially substituted with copper; (14) the antimicrobial mixed metal oxide comprises lanthanum manganese oxide (LMO) that is doped or partially substituted with strontium and copper; (15) the antimicrobial mixed metal oxide comprises lanthanum manganese oxide (LMO) that is doped or partially substituted with cobalt; (16) the antimicrobial mixed metal oxide comprises lanthanum manganese oxide (LMO) that is doped or partially substituted with potassium; (17) the antimicrobial mixed metal oxide comprises lanthanum manganese oxide (LMO) that is doped or partially substituted with nickel; (18) the antimicrobial mixed metal oxide comprises lanthanum manganese oxide (LMO) that is doped or partially substituted with strontium, nickel, and copper; (19) the antimicrobial mixed metal oxide comprises a doped lanthanum manganese oxide of the formula $La_xM_yMnO_z$ wherein M is a metal other than lanthanum and manganese, x and y are each independently between 0 and 1, and z is between 2 and 4, with the doped lanthanum manganese oxide being charge balanced, and with the proviso that when y=0, x<0.85; (20) the film-forming composition comprises polyurethane, epoxy, silicone, polyamide, polyimide, acrylic, or alkyd resin; (21) the film-forming composition comprises a chemical agent resistant coating (CARC); and (22) the film-forming composition is in a particulate form in mixture with the particulate antimicrobial mixed metal oxide, sulfide or oxysulfide, as a cold spray formulation.

The disclosure in a further aspect relates to a coating formed by application of the antimicrobial coating material as variously described in the preceding paragraph to a surface of a substrate.

The disclosure in another aspect relates to an antimicrobial surface of a surface-presenting substrate, e.g., a fomite substrate, comprising an antimicrobial mixed metal oxide, sulfide or oxysulfide at the surface as a component thereof, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite, and such antimicrobial surface may in various embodiments comprise any one or more compatible additional features of the following: (1) the surface is hydrophilic; (2) the surface is hydrophobic; (3) the surface is amphiphilic; (4) the antimicrobial mixed metal oxide, sulfide or oxysulfide comprises a perovskite including a B-site transition metal including at least one of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn); (5) the antimicrobial mixed metal oxide, sulfide or oxysulfide comprises a perovskite including a B-site transition metal including at least one of cobalt, nickel, and manganese; (6) the antimicrobial mixed metal oxide comprises $La_{0.8}Sr_{0.2}MnO_3$; (7) the antimicrobial mixed metal oxide comprises $La_{0.65}Sr_{0.35}MnO_3$; (8) the antimicrobial mixed metal oxide comprises $La_{0.8}Sr_{0.2}Mn_{0.8}Cu_{0.2}O_3$; (9) the antimicrobial mixed metal oxide comprises $LaMn_{1.1}O_x$ wherein x is <3; (10) the antimicrobial mixed metal oxide comprises $La_{0.6}K_{0.4}MnO_3$; (11) the antimicrobial mixed metal oxide comprises $La_{0.55}K_{0.45}MnO_3$; (12) the antimicrobial mixed metal oxide comprises $Ca_{0.5}Sr_{0.5}Ni_xCu_{1-x}O_3$; (13) the antimicrobial mixed metal oxide comprises at least one of $La_{0.8}Sr_{0.2}MnO_3$, $La_{0.65}Sr_{0.35}MnO_3$, $La_{0.8}Sr_{0.2}Mn_{0.8}Cu_{0.2}O_3$, and $LaCoO_3$; (14) the antimicrobial mixed metal oxide comprises lanthanum manganese oxide (LMO) that is doped or partially substituted with other metal or metals; (15) the antimicrobial mixed metal oxide comprises lanthanum manganese oxide (LMO) that is doped or partially substituted with strontium; (16) the antimicrobial mixed metal oxide comprises lanthanum manganese oxide (LMO) that is doped or partially substituted with copper; (17) the antimicrobial mixed metal oxide comprises lanthanum manganese oxide (LMO) that is doped or partially substituted with strontium and copper; (18) the antimicrobial mixed metal oxide comprises lanthanum manganese oxide (LMO) that is doped or partially substituted with cobalt; (19) the antimicrobial mixed metal oxide comprises lanthanum manganese oxide (LMO) that is doped or partially substituted with potassium; (20) the antimicrobial mixed metal oxide comprises lanthanum manganese oxide (LMO) that is doped or partially substituted with nickel; (21) the antimicrobial mixed metal oxide comprises lanthanum manganese oxide (LMO) that is doped or partially substituted with strontium, nickel, and copper; (22) the antimicrobial mixed metal oxide comprises a doped lanthanum manganese oxide of the formula $La_xM_yMnO_z$ wherein M is a metal other than lanthanum and manganese, x and y are each independently between 0 and 1, and z is between 2 and 4, with the doped lanthanum manganese oxide being charge balanced, and with the proviso that when y=0, x<0.85; and (23) the antimicrobial mixed metal oxide, sulfide or oxysulfide is comprised in a coating on the substrate.

In a further aspect, the disclosure relates to a particulate antimicrobial material comprising a particulate core material in and/or on which an antimicrobial mixed metal oxide, sulfide or oxysulfide is incorporated, and such particulate antimicrobial material may in various embodiments comprise any one or more compatible additional features of the following: (1) the particulate core material comprises silica, alumina, macroreticulate polymer, porous silicon, glass, or ceramic; (2) the particulate core material comprises graphene, graphene oxide, a ceramic, or diatomaceous earth; (3) the antimicrobial mixed metal oxide, sulfide or oxysulfide comprises a perovskite including a B-site transition metal including at least one of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn); (4) the antimicrobial mixed metal oxide, sulfide or oxysulfide comprises a perovskite including a B-site transition metal including at least one of cobalt, nickel, and manganese; (5) the antimicrobial mixed metal oxide comprises $La_{0.8}Sr_{0.2}MnO_3$; (6) the antimicrobial mixed metal oxide comprises $La_{0.65}Sr_{0.35}MnO_3$; (7) the antimicrobial mixed metal oxide comprises $La_{0.8}Sr_{0.2}Mn_{0.8}Cu_{0.2}O_3$; (8) the antimicrobial mixed metal oxide comprises $LaMn_{1.1}O_x$ wherein x is <3; (9) the antimicrobial mixed metal oxide comprises $La_{0.6}K_{0.4}MnO_3$; (10) the antimicrobial mixed metal oxide comprises $La_{0.55}K_{0.45}MnO_3$; (11) the antimicrobial mixed metal oxide comprises $Ca_{0.55}Sr_{0.5}Ni_xCu_{1-x}O_3$; (12) the antimicrobial mixed metal oxide comprises at least one of $La_{0.8}Sr_{0.2}MnO_3$, $La_{0.65}Sr_{0.35}MnO_3$, $La_{0.8}Sr_{0.2}Mn_{0.8}Cu_{0.2}O_3$, and $LaCoO_3$; (13) the antimicrobial mixed metal oxide comprises lanthanum manganese oxide (LMO) that is doped or partially substituted with other metal or metals; (14) the antimicrobial mixed metal oxide comprises lanthanum manganese oxide (LMO) that is doped or partially substituted with strontium; (15) the antimicrobial mixed metal oxide comprises lanthanum manganese oxide (LMO) that is doped or partially substituted with copper; (16) the antimicrobial mixed metal oxide comprises lanthanum manganese oxide (LMO) that is doped or partially substituted with strontium and copper; (17) the antimicrobial mixed metal oxide comprises lanthanum manganese oxide (LMO) that is doped or partially substituted with cobalt; (18) the antimicrobial mixed metal oxide comprises lanthanum manganese oxide (LMO) that is doped or partially substituted with potassium; (19) the antimicrobial mixed metal oxide comprises lanthanum manganese oxide (LMO) that is doped or partially substituted with nickel; (20) the antimicrobial mixed metal oxide comprises lanthanum manganese oxide (LMO) that is doped or partially substituted with strontium, nickel, and copper; (21) the antimicrobial mixed metal oxide comprises a doped lanthanum manganese oxide of the formula $La_xM_yMnO_z$ wherein M is a metal other than lanthanum and manganese, x and y are each independently between 0 and 1, and z is between 2 and 4, with the doped lanthanum manganese oxide being charge balanced, and with the proviso that when y=0, x<0.85; and (22) the antimicrobial mixed metal oxide is comprised in a coating on the particulate core material.

The disclosure relates in a further aspect to a method of inactivating a microorganism, comprising contacting the microorganism with an antimicrobial mixed metal oxide, sulfide or oxysulfide, wherein: (i) when the antimicrobial mixed metal oxide is a lanthanum manganese oxide of the formula $La_xMnO_3$, x does not exceed 0.85; and (ii) the antimicrobial mixed metal oxide is not magnesium ferrite, and such method may in various embodiments comprise any one or more compatible additional features of the following: (1) the microorganism comprises a bacterium; (2) the microorganism comprises a virus; (3) the microorganism comprises an envelope virus; (4) the microorganism comprises SARS-CoV virus; (5) the microorganism comprises a fungus; (6) the contacting is conducted at a surface at which the antimicrobial mixed metal oxide, sulfide or oxysulfide is present; (7) the surface is hydrophilic or is coated with a hydrophilic coating; (8) the surface is hydrophobic or is coated with a hydrophobic coating; (9) the surface is amphiphilic; (10) the surface is a substrate surface; (11) the substrate is a textile, mat, web, clothing article, furniture article, furnishing article, building structure, building material, transportation vehicle, handheld article, machine, counter, cabinet, building fixture, coating, powder, or packaging material; (12) the antimicrobial mixed metal oxide, sulfide or oxysulfide is comprised in a coating on the substrate; (13) the antimicrobial mixed metal oxide, sulfide or oxysulfide comprises a perovskite including a B-site transition metal including at least one of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), meitnerium (Mt), damstadtium (Ds), roentgenium (Rg), and copernicium (Cn); (14) the antimicrobial mixed metal oxide, sulfide or oxysulfide comprises a perovskite including a B-site transition metal including at least one of cobalt, nickel, and manganese; (15) the antimicrobial mixed metal oxide comprises $La_{0.8}Sr_{0.2}MnO_3$; (16) the antimicrobial mixed metal oxide comprises $La_{0.65}Sr_{0.35}MnO_3$; (17) the antimicrobial mixed metal oxide comprises $La_{0.8}Sr_{0.2}Mn_{0.8}Cu_{0.2}O_3$; (18) the antimicrobial mixed metal oxide comprises $LaSr_{1.1}O_x$ wherein x is <3; (19) the antimicrobial mixed metal oxide comprises $La_{0.6}K_{0.4}MnO_3$; (20) the antimicrobial mixed metal oxide comprises $La_{0.55}K_{0.45}MnO_3$; (21) the antimicrobial mixed metal oxide comprises $Ca_{0.5}Sr_{0.5}Ni_xCu_{1-x}O_3$; (22) the antimicrobial mixed metal oxide comprises at least one of $La_{0.8}Sr_{0.2}MnO_3$, $La_{0.65}Sr_{0.35}MnO_3$, $La_{0.8}Sr_{0.2}Mn_{0.8}Cu_{0.2}O_3$, and $LaCoO_3$; (23) the antimicrobial mixed metal oxide comprises lanthanum manganese oxide (LMO) that is doped or partially substituted with other metal or metals; (24) the antimicrobial mixed metal oxide comprises lanthanum manganese oxide (LMO) that is doped or partially substituted with strontium; (25) the antimicrobial mixed metal oxide comprises lanthanum manganese oxide (LMO) that is doped or partially substituted with copper; (26) the antimicrobial mixed metal oxide comprises lanthanum manganese oxide (LMO) that is doped or partially substituted with strontium and copper; (27) the antimicrobial mixed metal oxide comprises lanthanum manganese oxide (LMO) that is doped or partially substituted with cobalt; (28) the antimicrobial mixed metal oxide comprises lanthanum manganese oxide (LMO) that is doped or partially substituted with potassium; (29) the antimicrobial mixed metal oxide comprises lanthanum manganese oxide (LMO) that is doped or partially substituted with nickel; (30) the antimicrobial mixed metal oxide comprises lanthanum manganese oxide (LMO) that is doped or partially substituted with strontium, nickel, and copper; and (31) the antimicrobial mixed metal oxide comprises a doped lanthanum manganese oxide of the formula $La_xM_yMnO_z$ wherein M is a metal other than lanthanum and manganese, x and y are each independently between 0 and 1, and z is between 2 and 4, with the doped lanthanum manganese oxide being charge balanced, and with the proviso that when y=0, x<0.85.

The features and advantages of the present disclosure are more fully shown by the following non-limiting examples.

Figure 2:
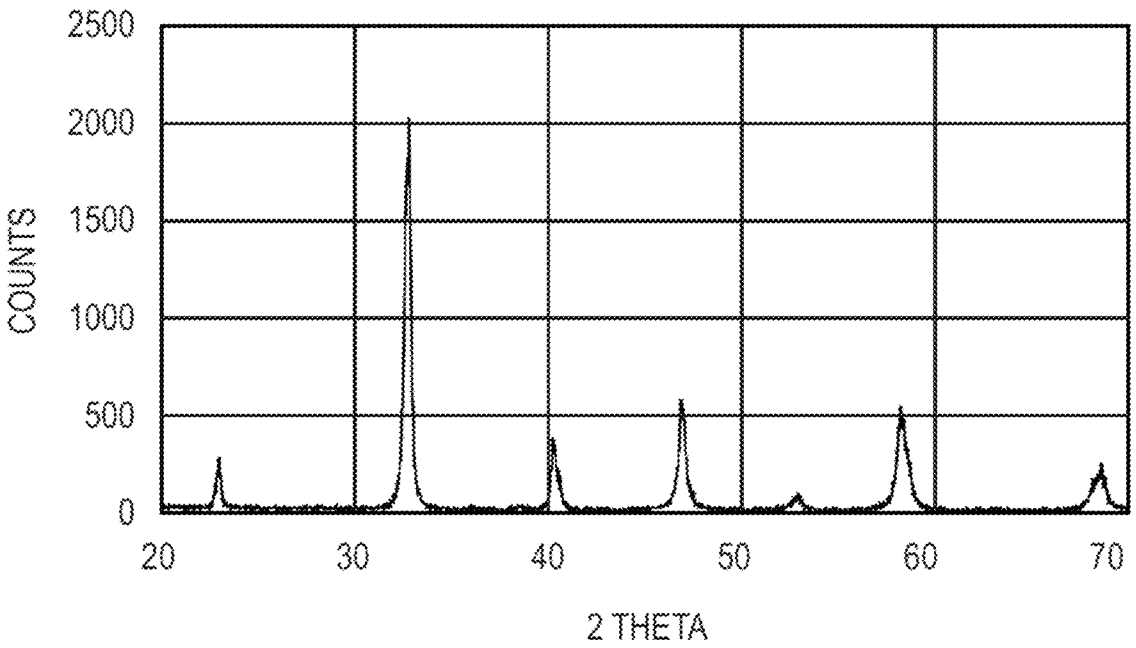
FIG. 2 shows an XRD trace for $La_{0.65}Sr_{0.35}MnO_2$ prepared by solid-state synthesis, involving a stoichiometric mixture of $La_2O_3$, $SrCO_3$, and $MnO_2$ and calcining at 1150° C. for 20 hrs., yielding a single-phase ceramic.

Several different manganese-based perovskite and spinel materials were synthesized by both solid-state and sol-gel processes. In this effort, calcining conditions were determined to be critical to yielding single-phase material. This is clearly shown in FIG. 2, which shows XRD traces for the perovskite $La_{0.65}Sr_{0.35}MnO_2$ prepared by solid-state synthesis, involving a stoichiometric mixture of $La_2O_3$, $SrCO_3$, and $MnO_2$ and calcining at 1150° C. yielded a single-phase ceramic.

Example 2

Figure 3:
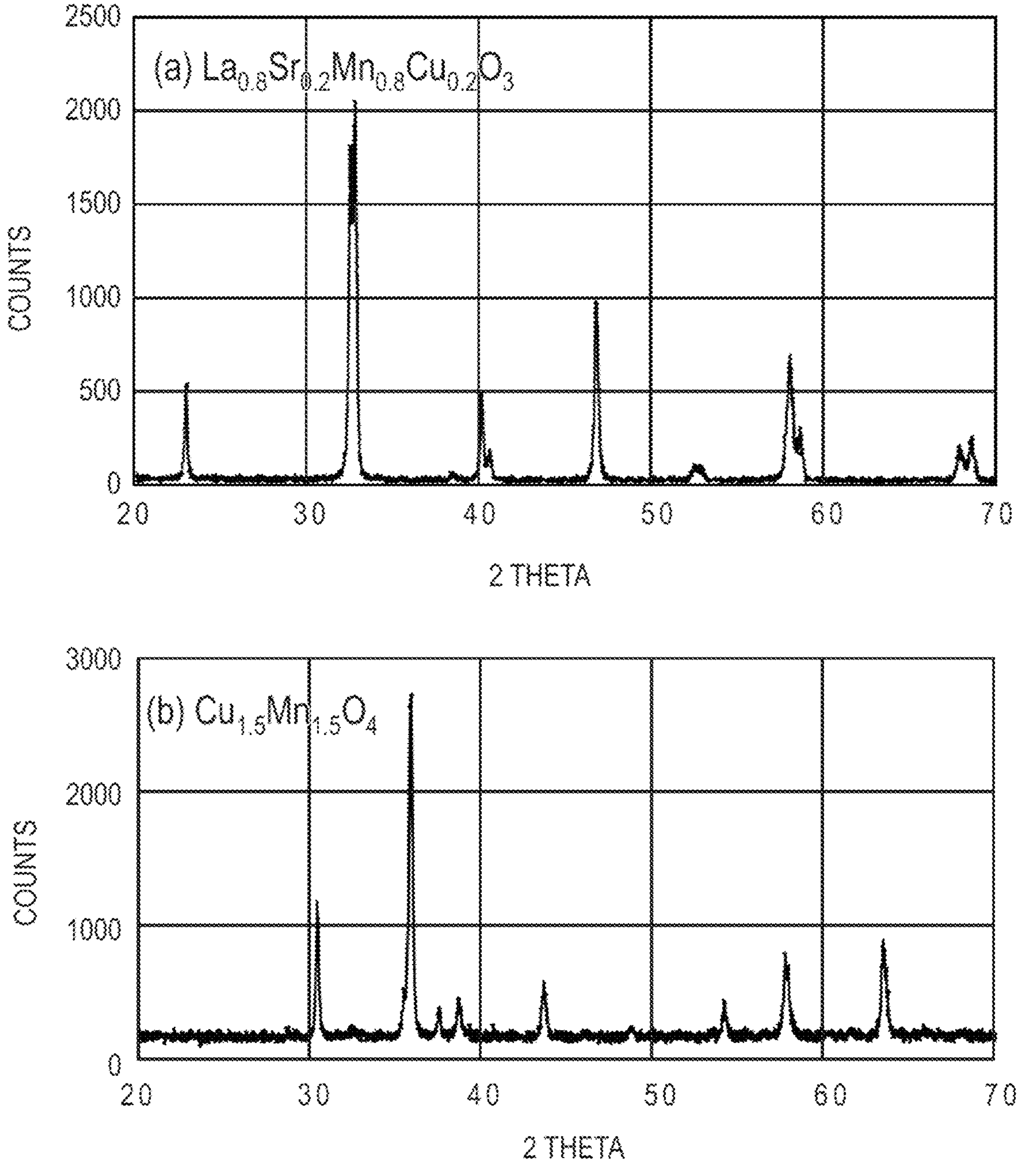
FIG. 3 shows an x-ray diffraction pattern for single phase perovskite $La_{0.8}Sr_{0.2}Mn_{0.8}Cu_{0.2}O_3$ synthesized by the Pechini method (upper trace (a), $La_{0.8}Sr_{0.2}Mn_{0.8}Cu_{0.2}O_3$), and an x-ray diffraction pattern for single-phase spinel $Cu_{1.5}Mn_{1.5}O_4$ synthesized by a sol-gel process, for which particle sizes are in the tens of nanometer range (lower trace (b), $Cu_{1.5}Mn_{1.5}O_4$).

Materials with manganese in the +4-oxidation state appear to be more reactive toward viruses than manganese in +2 or +3 oxidation states. To further push manganese into a higher oxidation state, $La_{0.8}Sr_{0.2}Mn_{0.8}Cu_{0.2}O_3$ was synthesized by the Pechini method. The nitrate salts of La, Sr, Mn, and Cu were dissolved in distilled water in a stoichiometric ratio and stirred for 10 minutes. Citric acid was added to the solution in a molar ratio of 2:1 with respect to the total metal cations. After stirring for 30 minutes, ethylene glycol was added in a 1:1 molar ratio to the citric acid solution. The resulting solution was stirred on an oil bath at 90° C. for 2 hrs., until a sol-gel was formed. The resulting spongy mass was transferred to a Pyrex dish and dried on a hot plate for 2 hours. It was further dried in an oven at 350° C. for 3 hrs. The resulting material was ground and calcined at 750° C. for 5 hrs., and finally ground again to remove aggregates. The theoretical oxidation state of manganese is between +3.50 and +3.75, depending on the percentage of Cu present in the +1-oxidation state (from 0 to 100%, respectively). XRD peaks in FIG. 3 (upper trace (a), $La_{0.8}Sr_{0.2}Mn_{0.8}Cu_{0.2}O_3$) show that a single-phase material was formed.

$Cu_{1.5}Mn_{1.5}O_4$, a spinel structure, was also synthesized using both solid-state and sol-gel processes. $Cu_{1.5}Mn_{1.5}O_4$ exhibits high activity for the oxidation of organic compounds. In a sol-gel synthesis similar to the above, $Ca(NO_3)_2 \cdot 4H_2O$ and $Mn(NO_3)_2$ were dissolved in distilled water in a 1:1 molar ratio and stirred for 10 minutes. Citric acid was added in a 1.25:1 molar ratio to the total metal cations. The solution was stirred for 3 hrs. at 90° C. on an oil bath until a sol-gel was formed. The resulting spongy mass was dried in an oven at 120° C. for 20 hrs., and then heat treated at 340° C. for 2 hrs. The resulting material was ground and calcined at 700° C. for 5 hrs. and then reground. The X-ray diffraction pattern in FIG. 3 (lower trace (b), $Cu_{1.5}Mn_{1.5}O_4$) evidences single-phase material as having been formed.

$Cu_{1.5}Mn_{1.5}O_4$ exhibits electronic transfer between copper and manganese cations within the spinel lattice, involving the following reaction: $Cu^{2+}+Mn^{3+} \rightarrow Cu^{1+}+Mn^{4+}$. XPS spectra show sub-stoichiometric amounts of copper on the surface along with over 50% of surface oxygen vacancies and oxygen defects, suggesting that the oxidation states of copper and manganese may be different from that of the bulk. In this perovskite, copper can provide synergistic antimicrobial effects, with $Cu^{+2}$ acting as a mild oxidation center while $Cu^{+1}$ provides antiviral activity based on its interaction with S—S bonds in proteins of viral species.

Example 3

Ceramic composite coatings were formulated by mixing lanthanum strontium manganese oxide (LSMO, $La_{0.65}Sr_{0.35}MnO_2$) with an alkyd binder. Mixing was done by hand in a mortar and pestle. Up to 20% volume (53% weight) of the ceramic LSMO perovskite with an average particle size of order 1 μm was then added to produce the LSMO CARC formulation.

Figure 4:
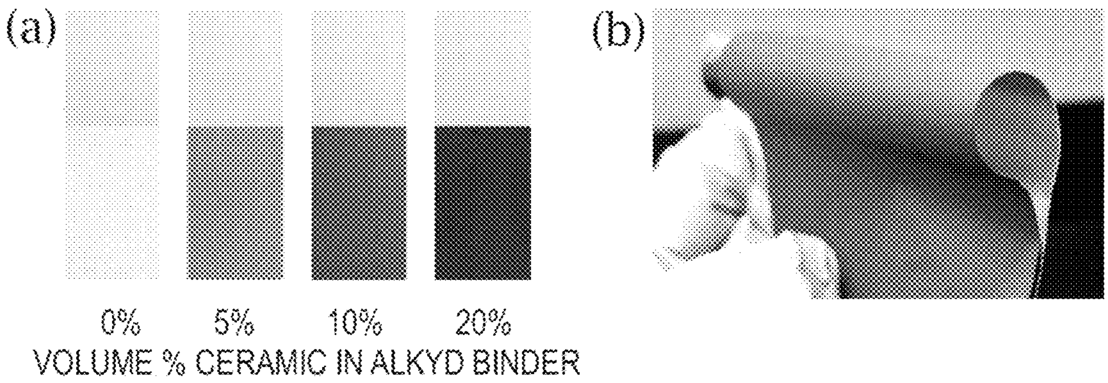
FIG. 4 in images (a) shows an alkyd binder respectively containing 0%, 5%, 10%, and 20% by volume of lanthanum strontium manganese oxide as applied to a polypropylene substrate by painting, and with image (b) showing that the coating formulated from an alkyd binder and 20 vol. % LSMO based on total volume of the formulation was adherent, flexible, and robust on an aluminum foil substrate.

FIG. 4 in images (a) shows coatings of the alkyd binder respectively containing 0%, 5%, 10%, and 20% by volume of lanthanum strontium manganese oxide as applied to a polypropylene substrate by painting and with image (b) showing that the coating formulated from such CARC and 20 vol. % LSMO based on total volume of the formulation was adherent, flexible, and robust on an aluminum foil substrate.

Example 4

Figure 5:
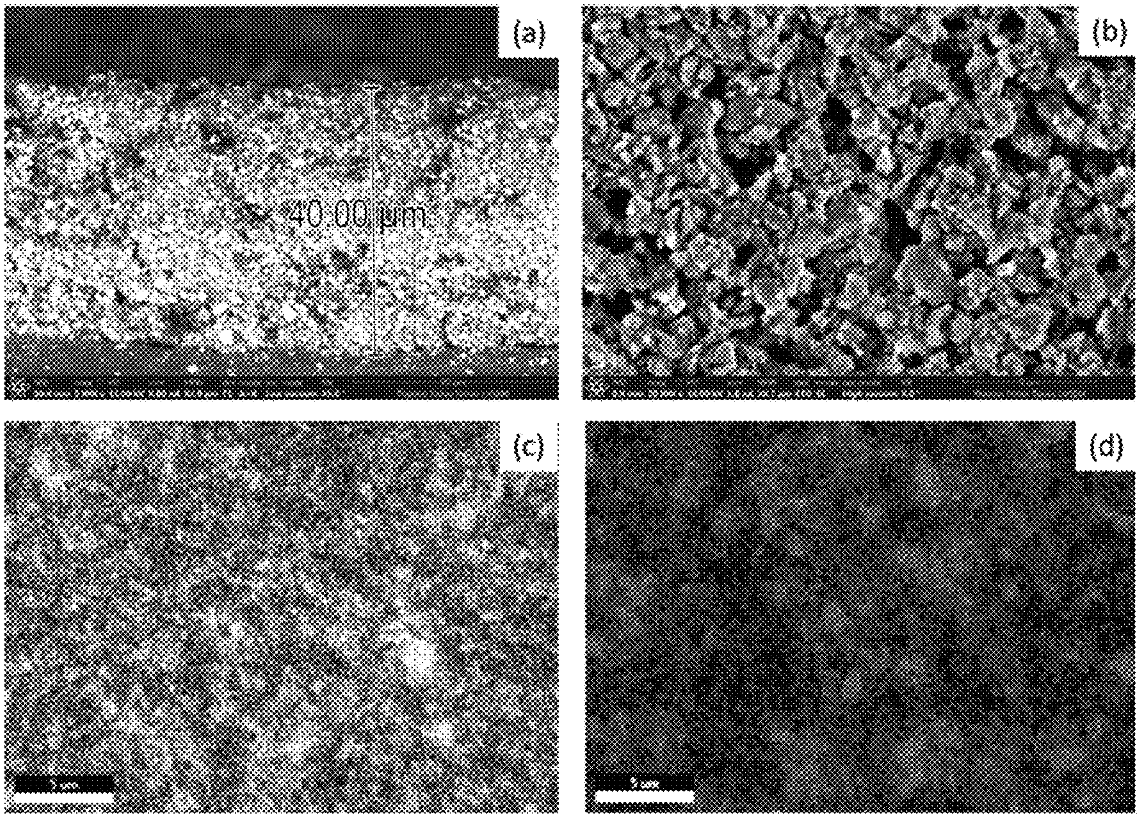
FIG. 5 shows a scanning electron micrograph (SEM) image of a chemical agent resistive coating (CARC) containing 20% vol $La_{0.65}$ $Sr_{0.35}MnO_3$ on an aluminum foil substrate in cross-section showing a ~40 micron film thickness (image (a)), with the enlarged plan views (images (b) and (c)) confirming the particle size as ~1 micron and showing a large number of $La_{0.65}Sr_{0.35}Mn_{0.3}$ particles on/near the surface of the coating, and with EDAX images for titanium (pigment particles) and lanthanum (ceramic) showing a fairly uniform distribution of both CARC and ceramic in the coating on this length scale (image (d)).

A chemical agent resistive coating containing 20% vol $La_{0.65}Sr_{0.35}MnO_3$ was deposited on an aluminum foil substrate. FIG. 5 shows a scanning electron micrograph (SEM) image of the resulting coating in cross-section showing a ~40 mm film thickness (image (a)), with the enlarged plan views (image (b) confirming the particle size as ~1 micron and showing a large number of $La_{0.65}Sr_{0.35}MnO_3$ particles on/near the surface of the coating, and with EDAX images for titanium (pigment particles) and lanthanum (ceramic)

showing a fairly uniform distribution of both CARC and ceramic in the coating on this length scale (images (c) and (d), respectively).

The respective pure CARC coating and the CARC+20% vol LSMO ($La_{0.65}Sr_{0.35}MnO_2$) coating (CARC+Ceramic) were compared, with the following results set out in Table 1.

TABLE 1

| Parameter | Protocol | CARC | CARC + Ceramic |
|---|---|---|---|
| Gloss | 60° and 85° angle of incidence | 60°: <1<br>85°: 1.9/3.2-3.5 | 60°: <1<br>85°: 8.5/3.2-3.3 (a) |
| Adhesion | ASTM D3559B | 5A | 4A (pass) (b) |
| Supertropical bleach | MIL-DTL-64159B | Passed 1 hour spot test | Passed 1 hour spot test |
| Flexibility | ASTM D522, MIL-DTL-64159B | ¼" Pass | ¼" Pass |
| Wear resistance | ASTM D4060 modified (H10 wheel/1000 g) (i) | Avg. 1131 cycles | Avg. 386 cycles (c) |
| Impact resistance | ASTM D2794 (in*lbs) | Passed 40/20 (d) | Passed 40/20 |
| Hydrophilicity | Sessile drop contact angle (water) (e) | 48° | 0° |
| Antiviral (vaccinia) | 99% inactivation in 5 min. | Control (f) | 99.9 + % in 5 min. (g) |
| Antibacterial (*Bacillus atrophaeus*) | 99% inactivation in 5 min. | Control | 95% in 5 min. (h) |
| Antiviral after abrasion (i) | 99% inactivation in 5 min. | Not tested, but pure CARC shows no antiviral effects | 99.9% in 5 min. |
| Heat/humidity (j) | 99% inactivation in 5 min | Pass | No effect |

Notes:

(a) At an 85° angle of incidence, the draw-down coatings had a gloss of 1.9 for pure CARC and 8.5 for CARC + 20% vol $La_{0.65}Sr_{0.35}MnO_3$ while the painted samples had a gloss of 3.2-3.5 and 3.2-3.3, respectively. Decreasing the ceramic content to 2% vol or 5% vol reduces the gloss to below 2.5. The gloss of films measured at a 60° angle of incidence was <1 in all cases. Spray-coatings are anticipated to further reduce the measured gloss.

(b) Photographic analysis of the adhesion indicated that the bond between CARC and the steel substrate appeared to be much stronger than the bond between CARC and the $La_{0.65}Sr_{0.35}MnO_3$ powder.

(c) Limited test with 1000 g load to accelerate abrasion. Enhanced wear on the edges of both the pure CARC and CARC + ceramic coatings, which may be due to the wheel dragging loosened ceramic particles across the rest of the coating ⇒ need larger coating area for more accurate analysis. Based on results of (b), lower ceramic concentration and/or smaller (nanoscale) particle sizes are expected to enhance wear performance.

(d) First value: impact in in*lb on the coating side/second value: impact on the substrate side.

(e) There is no MIL-SPEC for contact angle. A hydrophilic surface is contemplated to improve the performance of the coating toward pathogens and chemical warfare agents as it spreads the incoming droplets over a larger contact area, thus enhancing the chances of inactivation.

(f) CARC-coated samples were used as controls. Some viral inactivation was measured due to the manipulations but was considered 0% viral inactivation when compared to samples coated with CARC + 20% vol $La_{0.65}Sr_{0.35}MnO_3$.

(g) Exceeds requirement of 99% viral inactivation in 5 min.

(h) Requirement of 99% bacterial inactivation in 5 min. not fully met in this test. Changes in particle chemistry and/or size/shape and surface morphology are correspondingly appropriate.

(i) ~⅓ of the thickness of the coating was removed by rubbing the surface with 320 grit sandpaper to simulate abrasion before antiviral challenge with vaccinia.

(j) Coatings survive heating in an autoclave (121° C./15 psi steam), far above the CARC requirements (66° C./100% relative humidity).

Example 5

Vaccinia (VACV) was chosen to test as a surrogate for smallpox (variola) virus. The experimental procedure for exposing the samples to the virus and the subsequent plaque assay was as follows.

5 μl of virus was spread on each substrate and placed inside individual wells of 12-well plates (3-fold replicates). The samples were incubated in lab air for designated times (e.g., 5 minutes, 15 minutes, 120 minutes). DME was added in the amount of 0.5 mL to each well and the plate was placed in a rocking platform for 5 minutes (cell culture setting) to extract virus from the substrate. The media was transferred to a 2 mL tube via pipette, and dilutions were performed, $10^{-1}$ to $10^{-3}$ (100 μl into 900 μl DME). Plaque assays were then performed in the 12-well plates (vero cells, dilutions $10^{-1}$ to $10^{-3}$ (100 μl of each dilution), aspirate and overlay with 0.5 mL DME/2.5% with antibiotics. Incubate 3 days at 37° C. in a $CO_2$ incubator, then stained with crystal violet and count the plaques.

2-cm diameter stainless steel disk substrates were used to minimize any impact of corrosion/iron oxide on viral inactivation. Coatings were painted onto the substrates and sterilized by immersion in 70% ethanol and drying overnight. Controls included empty wells (impact of plastic), clean stainless-steel substrates (effect of metal), and CARC coating on stainless-steel substrates (impact of CARC).

Figure 6:
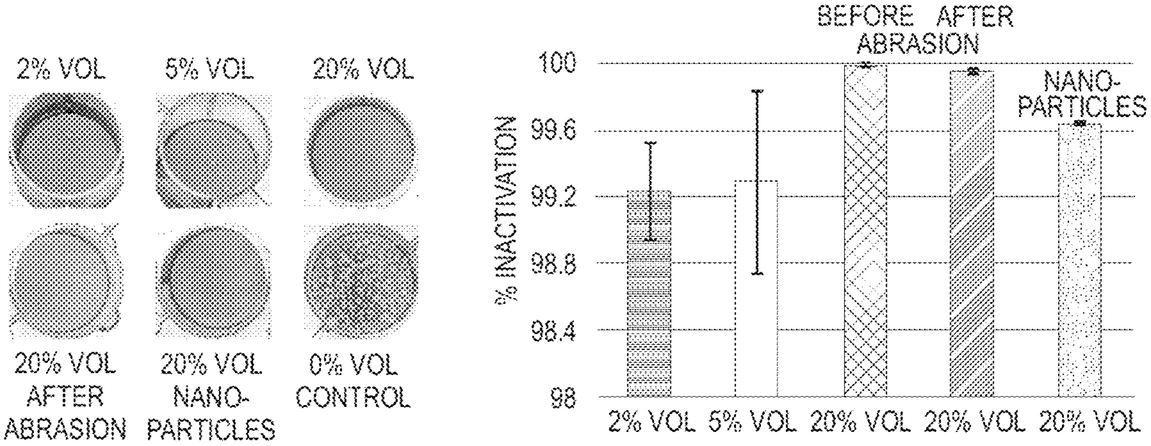
FIG. 6 provides a photographic comparison of plaque growth in a plaque assay demonstrating antiviral activity of a chemical agent resistant coating containing varying amounts of $La_{0.65}Sr_{0.35}MnO_3$ on a stainless-steel disk and a pure chemical agent resistant coating on a stainless steel disk as a control (0% volume) for exposure to vaccinia virus for 5 minutes at room temperature together with a bar graph. Samples were also tested before and after abrasion, to determine the abrasion resistance and viral inactivation character of the respective samples. Error bars are +/−standard deviations.

FIG. 6 provides a photographic comparison of plaque growth in a plaque assay demonstrating antiviral activity of a chemical agent resistant coating containing varying amounts of $La_{0.65}Sr_{0.35}MnO_3$ on a stainless-steel disk and a pure chemical agent resistant coating on a stainless-steel disk as a control (0% volume) for exposure to vaccinia virus for 5 minutes at room temperature together with a bar graph. Samples were also tested before and after abrasion, to determine the abrasion resistance and viral inactivation character of the respective samples. Error bars are +/−standard deviations.

To determine the lifetime of the coating, three samples each were collected from cycles 1, 2, 5, and 10 times after a 5-minute exposure to the virus using the following procedure. Controls were empty wells (plastic substrate).

A 5 μl viral challenge was carried out as described above, followed by a 5 minute wait at room temperature, followed by a wash with 500 μl of the medium for 5 minutes, and collection of sample on the first, second, fifth, and tenth applications to recover the virus for titration (this step was amended on the other cycles). All samples were washed with 2 mL of double distilled water for 5 minutes in a 6-well plate. The discs were lifted and transferred to paper towels in a petri dish, and the discs were allowed to dry for 5 minutes at 37° C. in a dry incubator. The procedure was repeated 9 more times and collection was carried out after 2, 5, and 10 times total, with analysis as above.

The same 6 well plate was used throughout the experiment 10 between each 2 washes, wells were rinsed with 2 mL of double distilled water to reduce viral carryover.

Figure 7:
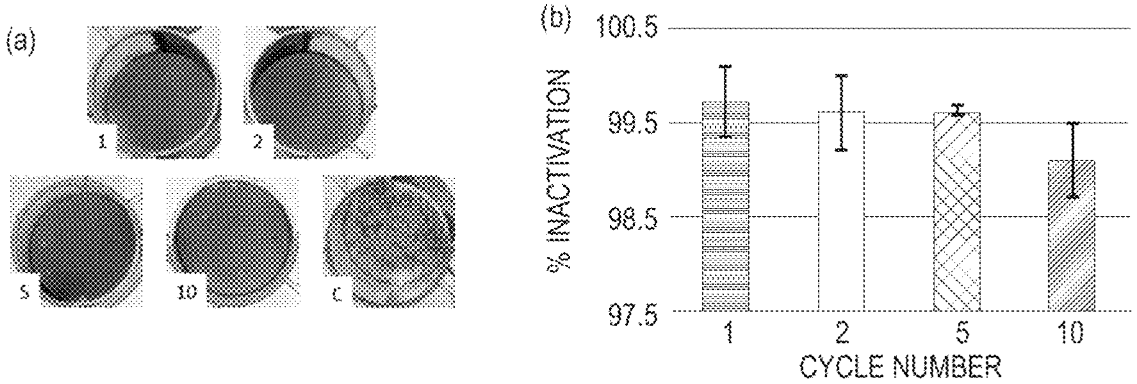
FIG. 7 shows the results of the coating lifetime cycling antiviral plaque assay, in which the cycle number is shown in the lower left portion of each photograph, with C=control, and with a bar chart of the data being shown in graph (b) of FIG. 7, in which error bars are +/−standard deviations, and controls were empty wells (plastic substrate).

FIG. 7 shows the results of the coating lifetime cycling antiviral plaque assay, with photographs of the plaque assay being shown in images (a) of FIG. 7, in which the cycle number is shown in the lower left portion of each photograph, with C=control, and with a bar chart of the data being shown in graph (b) of FIG. 7, in which error bars are +/−standard deviations, and controls were empty wells (plastic substrate). In the lifetime cycling assay, cycle 1 reproduced the 99.7% viral inactivation of the previous series of experiments, and more than 99% viral inactivation in exposure to CARC+20% vol LSMO at room temperature was observed even at the $10^{th}$ cycle, evidencing the strong and persistent antiviral activity of the CARC+20% vol LSMO coating.

Example 6

Chemical agent coatings were prepared and deposited on stainless steel discs, including a CARC coating containing 20% by volume $La_{0.65}$ $Sr_{0.35}MnO_3$ (CARC+20% vol. ceramic/SS disk), and a pure CARC coating containing no $La_{0.65}Sr_{0.35}MnO_3$ (CARC/SS Disk), following which the coatings were subjected to antibacterial plaque assay utilizing *Bacillus atrophaeus* (surrogate for *Bacillus anthracia*) by the following antibacterial testing method of: make a dilution between 10E-2 to 10E-4 of the 20-h growth then spread 5 μl on the disk. Incubate at room temperature for 5 min in a 12-well plate, add 1 ml tryptic soy broth, shake for 5 min, collect then make serial dilutions to titer. 100 μl of serially diluted bacteria was plated on tryptic soy agar plates and incubated at 30° C. overnight (~18 h) to count colonies. Incubate 3 days at 37° C. in a $CO_2$ incubator. Stain with crystal violet and count plaques. 2-cm diameter stainless steel disk substrates were used to minimize any impact of corrosion/iron oxide on viral inactivation. Coatings were painted onto the substrates and sterilized by immersion in 70% ethanol and drying overnight.

Figure 8:
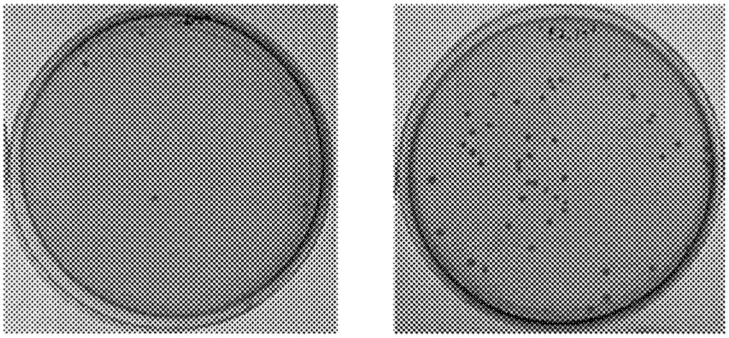
FIG. 8 provides a photographic comparison of plaque assay samples for chemical agent resistant coatings on stainless steel discs, in which the sample CARC coating shown in the left image contained 20% by volume $La_{0.65}Sr_{0.35}MnO_3$ after exposure to *Bacillus atrophaeus*, and the sample coating shown on the right was a pure CARC coating containing no $La_{0.65}Sr_{0.35}MnO_3$ after exposure to *Bacillus atrophaeus*.

The results are shown in FIG. 8, and evidence significant presence of bacterial plaques on the CARC/SS Disk sample and the presence of only a low level of bacterial plaques on the CARC+20% vol. ceramic/SS disk sample (>95% bacterial inactivation).

Example 7

The sol-gel synthesis of $La_{0.65}$ $Sr_{0.35}MnO_3$ was performed using stoichiometric amounts of $La(NO_3)_3·6H_2O$, $Sr(NO_3)_2$ and a 50% solution of $Mn(NO_3)_2$ and citric acid as a ligand in 1:1 mole ratio to the metal ions. The solution was heated on an oil bath at 90° C. for 4 h to evaporate the solvent and promote polymerization, until a spongy orange solid was formed. The resulting mass was dried at 180° C. for 20 h, then it was ground and calcined at 600° C. for 4 h. It yielded a single-phase material with a particle size of ~50 nm and some trace impurities due to $Mn_3O_4$. The antiviral properties of this material were tested as above and the results (>99.6% inactivation) are shown in FIG. 6.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A method of imparting anti-fouling character to a transportation substrate surface, comprising applying to the substrate surface a coating which consists of or which comprises:
(1) lanthanum strontium manganese oxide;
(2) lanthanum copper manganese oxide;
(3) lanthanum strontium manganese copper oxide;
(4) lanthanum potassium manganese oxide;
(5) lanthanum cobalt oxide;
(6) calcium strontium nickel copper oxide;
(7) lanthanum sodium manganese oxide;
(8) lanthanum cobalt manganese oxide;
(9) lanthanum nickel manganese oxide;
(10) lanthanum strontium nickel copper manganese oxide;
(11) lanthanum cerium manganese oxide;
(12) lanthanum strontium cerium manganese oxide;
(13) lanthanum calcium cerium manganese oxide;
(14) lanthanum strontium manganese iron oxide;
(15) lanthanum cerium manganese iron oxide;
(16) lanthanum strontium cerium manganese iron oxide;
(17) lanthanum calcium cerium manganese iron oxide;
(18) lanthanum cerium manganese copper oxide;
(19) lanthanum strontium cerium manganese copper oxide;
(20) lanthanum calcium cerium manganese copper oxide;
(21) lanthanum strontium manganese iron copper oxide;
(22) lanthanum calcium manganese iron copper oxide;
(23) lanthanum cerium manganese iron copper oxide;
(24) lanthanum strontium cerium manganese iron copper oxide;
(25) lanthanum manganese iron oxide;
(26) cerium manganese oxide;
or
(27) a corresponding sulfide or oxysulfide of any of (1) to (26), on a carrier particle, wherein the carrier particle is an inert carrier particle.

2. The method of claim 1, wherein the substrate surface is a surface of a watercraft.

3. The method of claim 1, wherein substrate surface is a surface of a ship.

4. The method of claim 1, wherein the substrate surface is a surface of a barge.

5. The method of claim 1, wherein substrate surface is a surface of a marine vessel.

6. The method of claim 1, wherein the coating is applied to the substrate surface by cold spray, thermal spray, plasma spray, spin coating of precursors, dip coating, spray coating, painting, or roller coating.

7. The method of claim 1, wherein the coating is a fully ceramic coating.

8. The method of claim 1, wherein the coating comprises (1) lanthanum strontium manganese oxide.

9. The method of claim 8, wherein the lanthanum strontium manganese oxide has a formula of $La_{0.8}Sr_{0.2}MnO_3$ or $La_{0.65}Sr_{0.35}MnO_3$.

10. The method of claim 1, wherein the coating comprises (2) lanthanum copper manganese oxide.

11. The method of claim 1, wherein the coating comprises (3) lanthanum strontium manganese copper oxide.

12. The method of claim 11, wherein the lanthanum strontium manganese copper oxide has a formula of $La_{0.8}Sr_{0.2}Mn_{0.8}Cu_{0.2}O_3$.

13. The method of claim 1, wherein the coating comprises (4) lanthanum potassium manganese oxide.

14. The method of claim 13, wherein the lanthanum potassium manganese oxide has a formula of $La_{0.6}K_{0.4}MnO_3$, $La_{0.55}K_{0.45}MnO_3$, or $La_{0.35}K_{0.65}MnO_3$.

15. The method of claim 1, wherein the coating comprises (5) lanthanum cobalt oxide.

16. The method of claim 15, wherein the lanthanum cobalt oxide has a formula of $LaCoO_3$.

17. The method of claim 1, wherein the coating comprises (6) calcium strontium nickel copper oxide.

18. The method of claim 17, wherein the calcium strontium nickel copper oxide has a formula of $Ca_{0.5}Sr_{0.5}Ni_xCu_{1-x}O_3$.

19. The method of claim 1, wherein the coating comprises (7) lanthanum sodium manganese oxide.

20. The method of claim 1, wherein the coating comprises (8) lanthanum cobalt manganese oxide.

21. The method of claim 1, wherein the coating comprises (9) lanthanum nickel manganese oxide.

22. The method of claim 1, wherein the coating comprises (10) lanthanum strontium nickel copper manganese oxide.

23. The method of claim 1, wherein the coating comprises (11) lanthanum cerium manganese oxide.

24. The method of claim 1, wherein the coating comprises (12) lanthanum strontium cerium manganese oxide.

25. The method of claim 1, wherein the coating comprises (29) a corresponding sulfide or oxysulfide of any of (1) to (28).

26. The method of claim 1, wherein the coating comprises a film-forming composition in which (1), (2), (3), (4), (5), (6), (7), (8), (9), (10), (11), (12), (13), (14), (15), (16), (17), (18), (19), (20), (21), (22), (23), (24), (25), (26), or (27) is present in the coating at a concentration of from 0.05% to 100% of the total mass of the coating.

27. The method of claim 1, wherein the coating comprises a film-forming composition in which (1), (2), (3), (4), (5), (6), (7), (8), (9), (10), (11), (12), (13), (14), (15), (16), (17), (18), (19), (20), (21), (22), (23), (24), (25), (26), or (27) is present in the coating at a concentration of from 2 to 53% by weight, based on total weight of the coating.

28. The method of claim 1, wherein the coating comprises a film-forming composition comprising polyurethane, epoxy, silicone, polyamide, polyimide, acrylic, alkyd, fluorinated polymer, or chlorinated polymer.

29. A method of imparting anti-fouling character to a substrate surface, comprising applying to the substrate surface a coating which consists of or which comprises lanthanum strontium manganese oxide, wherein (a) the substrate surface is not a building structure, (b) the lanthanum strontium manganese oxide is not in a graphene composite that is spin coated on the substrate surface, and (c) when the lanthanum strontium manganese oxide is on a carrier particle, the carrier particle is an inert carrier particle.

* * * * *

UNITED STATES PATENT AND TRADEMARK OFFICE
CERTIFICATE OF CORRECTION

PATENT NO. : 12,139,417 B2
APPLICATION NO. : 18/165733
DATED : November 12, 2024
INVENTOR(S) : Lawrence H. Dubois et al.

It is certified that error appears in the above-identified patent and that said Letters Patent is hereby corrected as shown below:

In the Specification

Column 8, Line 45, "toxic" should be -- oxic --.

Column 8, Line 58, "toxic" should be -- oxic --.

Column 17, Line 59, "toxic" should be -- oxic --.

Column 18, Line 14, "ions ($HO^{-}{}_{ads}$), the ads, dissociative" should be -- ions ($HO^{-}{}_{ads}$), the dissociative --.

Column 23, Line 57, "$Ca_{0.8}Sr_{0.2}Ni_xCu_{1-x}O_3$" should be -- $Ca_{0.5}Sr_{0.5}Ni_xCu_{1-x}O_3$ --.

Column 25, Line 65, "$Ca_{0.55}Sr_{0.5}Ni_xCu_{1-x}O_3$" should be -- $Ca_{0.5}Sr_{0.5}Ni_xCu_{1-x}O_3$ --.

Column 27, Lines 43-44, after the sentence ending with "non-limiting examples.", and prior to the sentence beginning with "Several different manganese-based perovskite", the heading -- Example 1 -- should be inserted.

Column 31, Line 23, "*Bacillus anthracia*" should be -- bacillus anthracis --.

Signed and Sealed this
Eleventh Day of February, 2025

Coke Morgan Stewart
*Acting Director of the United States Patent and Trademark Office*